United States Patent
Kobayashi et al.

(10) Patent No.: US 7,931,954 B2
(45) Date of Patent: Apr. 26, 2011

(54) DECORATING MATERIAL

(75) Inventors: Toshitake Kobayashi, Saitama (JP); Kazuhiro Abe, Saitama (JP); Kenichi Tachihara, Chiba (JP); Eiichiro Yokochi, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/574,173

(22) PCT Filed: Sep. 30, 2004

(86) PCT No.: PCT/JP2004/014367
§ 371 (c)(1),
(2), (4) Date: Nov. 13, 2006

(87) PCT Pub. No.: WO2005/030486
PCT Pub. Date: Apr. 7, 2005

(65) Prior Publication Data
US 2007/0116933 A1 May 24, 2007

(30) Foreign Application Priority Data

Sep. 30, 2003 (JP) ................... 2003-341788
Sep. 30, 2003 (JP) ................... 2003-341789
Dec. 24, 2003 (JP) ................... 2003-426480
Jan. 29, 2004 (JP) ................... 2004-020803

(51) Int. Cl.
*B41M 5/00* (2006.01)
(52) U.S. Cl. ............ 428/195.1; 428/196; 428/197; 428/156; 428/423.1; 156/196; 526/279
(58) Field of Classification Search ........ 428/195.1, 428/196, 197, 186, 423.1, 156; 156/196; 526/279
See application file for complete search history.

(56) References Cited

U.S. PATENT DOCUMENTS
4,196,033 A * 4/1980 Arai et al. ............. 156/196
(Continued)

FOREIGN PATENT DOCUMENTS
EP 1237728 7/2003
(Continued)

OTHER PUBLICATIONS

Supplementary European Search Report dated Jun. 23, 2010, for Application No. 04788395.4-2304.

(Continued)

*Primary Examiner* — Bruce H. Hess
*Assistant Examiner* — Tamra L Amakwe
(74) *Attorney, Agent, or Firm* — Antonelli, Terry, Stout & Kraus, LLP.

(57) ABSTRACT

There is provided a decorative material comprising at least a substrate, a low-luster pattern ink layer partially formed on the substrate, and a surface protective layer which is present on and contacted with the low-luster pattern ink layer so as to cover a whole surface including both a region where the low-luster pattern ink layer is formed and a region where no low-luster pattern ink layer is formed, wherein the surface protective layer is formed by crosslinking and curing an ionizing radiation-curable resin composition, and provided therein with a low-gloss region which is located in a portion just above the low-luster pattern ink layer and in the vicinity of the portion and visually recognized as a concave portion. The decorative material is provided on a surface thereof with a pattern, and exhibits a difference in gloss according to the pattern which is visually recognized as a concave portion, thereby imparting a good convexo-concave feeling to a surface thereof.

34 Claims, 4 Drawing Sheets

U.S. PATENT DOCUMENTS

| | | | |
|---|---|---|---|
| 4,490,410 A * | 12/1984 | Takiyama et al. | 427/504 |
| 4,855,184 A * | 8/1989 | Klun et al. | 428/425.1 |
| 5,266,397 A * | 11/1993 | Ogawa et al. | 428/323 |
| 5,296,340 A * | 3/1994 | Tsukada et al. | 430/394 |
| 5,429,857 A | 7/1995 | Amemiya et al. | |
| 6,110,316 A * | 8/2000 | Kobayashi et al. | 156/230 |
| 6,306,947 B1 * | 10/2001 | Morishima et al. | 524/457 |
| 6,326,074 B1 * | 12/2001 | Takahashi | 428/156 |
| 6,428,875 B1 | 8/2002 | Takahashi et al. | |
| 6,514,624 B2 * | 2/2003 | Takemoto | 428/447 |
| 6,558,799 B2 * | 5/2003 | Takeuchi et al. | 428/423.1 |
| 6,841,221 B2 * | 1/2005 | MacQueen | 428/141 |
| 6,852,399 B2 * | 2/2005 | Takahashi et al. | 428/213 |
| 2005/0129970 A1 | 6/2005 | Yokochi | |

FOREIGN PATENT DOCUMENTS

JP     2001-138470     5/2001

OTHER PUBLICATIONS

English-language version of Chinese Official Action for Application No. 200480028410.1, dated Jan. 25, 2008.

* cited by examiner

DECORATING MATERIAL

TECHNICAL FIELD

The present invention relates to decorative materials provided on a surface thereof with a pattern which have a visual convexo-concave feeling due to a difference in gloss according to the pattern, and are excellent in durability of the surface including the pattern.

BACKGROUND ART

Surface decorative plates used for furniture or cabinets of kitchen wares generally have such a laminated structure in which a decorative sheet having, for example, a printed woodgrain pattern thereon is bonded onto a wood material, an inorganic material, a synthetic resin-based material, a metallic material such as steel plate, etc.

The decorative sheet used for the surface decorative plates has been required to exhibit various properties, e.g., adequate processing suitability such as flexibility, cuttability and breaking resistance for secondary processing such as laminating, wrapping and V-cutting, as well as weather resistance, light resistance, heat resistance, water resistance, solvent resistance, surface hardness, abrasion resistance, marring resistance, etc., upon use.

To meet these requirements for the decorative sheet, there has been used a substrate fully satisfying the above processing suitability which is provided on a surface thereof with a surface protective layer. The suitable surface protective layer conventionally used has been made of an ionizing radiation-curable resin composition. The ionizing radiation-curable resin composition is cured when exposed to an ionizing radiation such as ultraviolet ray and electron beam. The use of such an ionizing radiation-curable resin composition have various advantages such as solvent-free and environment-favorable formation of the surface protective coating layer without using an organic solvent, easy achievement of a good surface strength such as abrasion resistance owing to a high crosslinking density thereof, etc.

Meanwhile, with the recent tendency of consumers toward high-grade products, floor tiles and wall panels as well as furniture and cabinets of kitchen wares have been required to show a high-grade feeling. The decorative plates and decorative sheets used in these products have also been demanded to exhibit a good appearance with a high-grade feeling. For this reason, it becomes important to impart a good texture to these products by printing various patterns on a surface of a substrate sheet, or laminating a film with a pattern layer thereon, and there have been proposed various methods such as the method of delustering specific portions of the patterns or forming convex and concave patterns on such portions to impart a good texture thereto.

For example, there has been proposed the method in which surface regions which are different in wettability to an electron beam-curable coating material or a photocurable coating material from each other are formed on a substrate by providing a patterned coating layer on the substrate, and then the electron beam-curable coating material or the photocurable coating material is applied onto the substrate to recess a surface of the applied coating material in the surface region having a good wettability to the coating material and raise a surface of the applied coating material in the surface region having a poor wettability to the coating material (for example, refer to claims of Japanese Patent Publication No. 26937/1976). However, the above method has such a problem that when the concave portions, i.e., the surface region having a good wettability to the coating material is narrow, neat convexo-concave patterns are unattainable thereon. Further, although the existence of concave portions which are thick to some extent allows formation of convexo-concave patterns on the surface of the substrate, an end portion at which transition from the convex portion to the concave portion or vice versa occurs due to a surface tension of the coating material, etc., is rounded at a boundary region between the recessed and raised portions. As a result, there tend to arise problems such as lacking of sharpness of the convexo-concave patterns and formation of convex portions having a larger height than that of the raised portions, which results in lacking of reality, for example, in the case of woodgrain patterns, and poor appearance and touch feeling.

There has also been proposed the method in which a film on which a multicolor pattern is printed with an ink containing a curing retarder for retarding curing of resins in a solvent-free coating material and an ink containing no curing retarder is laminated on a resin coating layer formed by previously applying the solvent-free coating material on a substrate, the resin is cured in a curing atmosphere, and then the film is peeled off from the substrate to transfer the multicolor pattern onto the substrate (refer to claims of Japanese Patent Publication No. 33454/1976). According to this method, only the color pattern portion printed with the ink containing a curing retarder can be transferred and recessed. However, the above method not only requires use of the special inks, but also has such a problem that a curing reaction of the resin coating layer produced from the solvent-free coating material is unstable.

Further, there has been proposed the decorative material composed of two kinds of pattern layers successively formed on a substrate, i.e., a pattern layer made of an ordinary ink and a convex pattern layer made of an electron beam-curable composition, and a transparent resin layer formed on the pattern layers, in which after coating, the convex pattern layer is cured by irradiating an electron beam thereto through the transparent resin layer (refer to claims of Japanese Patent Publication No. 41505/1989). However, the decorative material has physically large convexo-concave portions and therefore tends to suffer from flaws or scratches in the convex portions. This tendency is more remarkable in the case where the convex portions have a larger surface area. Also, in this method, when it is intended to obtain a contrast of gloss such as, for example, woodgrain patterns, namely form a pattern having convex portions as a large part and very narrow concave portions between the convex portions like vessel grooves of woodgrain, there tends to arise such a problem that the concave portions are buried due to flowing of the coating material for forming the transparent resin layer, and the extent of burying of the concave portions becomes inadequately uneven, and further such physical convexo-concave portions cause a poor touch feeling.

In addition, there has been proposed the decorative paper with a woodgrain pattern which is produced by solid-printing a wooden undercoating color on a thin paper with an ultraviolet-curable printing ink containing a delustering agent, irradiating an active light ray to the resultant undercoat, printing a woodgrain pattern on the undercoat with a high-gloss ultraviolet-curable printing ink, and then irradiating an active light ray to the woodgrain pattern (refer to claims of Japanese Patent Application Laid-Open No. 84901/1976). In the decorative paper, portions printed with the high-gloss ink appear like convex portions, whereas portions printed with the ink containing the delustering agent appear like concave portions, thereby imparting a woody texture to the decorative paper. However, since the thus proposed decorative paper is provided with no transparent topcoat as a protective coating film, portions corresponding to so-called vessel-printing ink used for printing a woodgrain pattern are deteriorated in weather resistance, water resistance, abrasion resistance, marring resistance, etc., namely, shows a poor durability.

Further, there has been proposed the method for forming convexo-concave patterns by forming a pattern made of an ionizing radiation-shielding material on either a front or back surface of an ionizing radiation-penetrating release substrate having a surface releasability, laminating a convexo-concave pattern-forming substrate having a layer made of an uncured ionizing radiation-curable resin on a surface thereof on the release substrate, irradiating an ionizing radiation to the resultant laminate from a side of the release substrate to cure only the ionizing radiation-curable resin located corresponding to non-patterned portions made of the ionizing radiation-shielding material, and then removing the uncured resin in the ionizing radiation-curable resin layer together with the release substrate (refer to claim 8 of Japanese Patent Application Laid-open No. 253449/1989). According to the method of this invention, in the patterned portions made of the ionizing radiation-shielding material, the ionizing radiation-curable resin is kept uncured and attached to the release substrate, and removed together with the release substrate, whereas in the non-patterned portions made of the ionizing radiation-shielding material, the ionizing radiation-curable resin remains in a cured state on the substrate so that the convexo-concave patterns coordinated with aimed patterns are formed on the substrate. However, this method has disadvantages such as need of special materials such as the release material and the ionizing radiation-shielding material. Further, in the above method, since the uncured resin is attached to the release substrate and removed together therewith, there tend to occur problems such as failure of forming deep and sharp concave portions. In addition, in the case where an electron beam-curable resin is used as the ionizing radiation-curable resin, it is difficult to select a suitable electron-beam-shielding material.

Also, there has been proposed the method for producing a decorative plate with convexo-concave patterns by applying a radiation-polymerizable synthetic resin onto a printed or decorative paper-laminated substrate, irradiating a radiation onto the obtained synthetic resin layer until the synthetic resin reaches a semi-cured state, pressing the semi-cured layer using a cooling/pressing member such as a roll press with corresponding convexo-concave patterns, and then completely curing the synthetic resin (for example, refer to claims of Japanese Patent Publication No. 28264/1974). However, it is difficult to determine the specific conditions for keeping the resin in a suitable and stable semi-cured state, and the semi-cured synthetic resin is unstable. Further, this method has problems such as need of complicated two-stage curing procedure.

In consequence, there has also been proposed the method for continuously forming convexo-concave patterns by applying an electron-beam-curable resin on a substrate using a coating apparatus, and irradiating an electron beam to the applied electron-beam-curable resin while contacting the resin with a molding roll with corresponding convexo-concave patterns within an electron-beam irradiating apparatus to impart the convexo-concave patterns of the molding roll to the cured resin (for example, refer to claims and FIG. 1 of Japanese Patent Publication No. 50066/1988). However, this method has such an inconvenience that not an ordinary printing apparatus but the special molding roll apparatus is required to form the convexo-concave patterns, and the molding roll has only a limited molding speed, resulting in poor yield.

Further, there has been proposed the decorative material which is successively provided on a surface of a substrate with a coating film layer, a pattern layer and a surface protective layer made of a crosslinked and cured ionizing radiation-curable resin composition in which the pattern layer exhibits a higher penetrability to the ionizing radiation-curable resin composition than that of the coating film layer (for example, refer to claims and FIGS. 1 and 2 of Japanese Patent Application Laid-open No. 199028/2001). In the decorative material, since the ionizing radiation-curable resin composition tends to be readily penetrated into portions where the patterns are present, the portions to which the ionizing radiation-curable resin composition is penetrated are formed into concave portions, thereby obtaining a decorative material having convexo-concave patterns on a surface thereof. However, in the decorative material, it is required to add a large amount of an extender pigment or a porous material to the pattern layer in order to impart a sufficient absorptivity and penetrability to the patterns layer. In this case, since the pattern layer has a porous structure and therefore tends to become brittle, the resultant convex portions of the decorative material tend to be deteriorated in durability and stain resistance. On the other hand, when it is intended to inhibit the pattern layer from being formed into a porous structure in order to enhance a durability and stain resistance of the convex portions, there arises such a problem that the convex portions are insufficient in depth and sharpness. Further, the decorative material have physical convexo-concave portions and therefore exhibit a poor touch feeling which must be further improved.

DISCLOSURE OF THE INVENTION

The present invention has been made in view of the above conventional problems. An object of the present invention is to provide a decorative material having a pattern on a surface thereof and exhibiting a difference in gloss according to the pattern which is visually recognized as a concave portion, thereby imparting a convexo-concave feeling to the surface thereof, and further having good solvent resistance and abrasion resistance, or a high interlaminar strength.

As a result of intensive and extensive researches to achieve the above object, the inventors have found that the above problems can be overcome by a decorative material which comprises at least a substrate, a low-luster pattern ink layer partially formed on the substrate, and a surface protective layer which is present on and contacted with the low-luster pattern ink layer so as to cover a whole surface thereof including both a region where the low-luster pattern ink layer is formed and a region where no low-luster pattern ink layer is formed, wherein the surface protective layer is formed by crosslinking and curing an ionizing radiation-curable resin composition, and provided therewithin with a low-gloss region which is located in a portion just above the low-luster pattern ink layer and in the vicinity of the portion, and is visually recognized as a concave portion. The present invention has been accomplished on the basis of the finding.

Thus, the present invention provides:

(1) A decorative material comprising at least a substrate, a low-luster pattern ink layer partially formed on the substrate, and a surface protective layer which is present on and contacted with the low-luster pattern ink layer so as to cover a whole surface including both a region where the low-luster pattern ink layer is formed and a region where no low-luster pattern ink layer is formed, wherein the surface protective layer is formed by crosslinking and curing an ionizing radiation-curable resin composition, and provided therein with a low-gloss region which is located in a portion just above the low-luster pattern ink layer and in the vicinity of the portion, and visually recognized as a concave portion;

(2) a decorative material comprising at least a substrate, a low-luster pattern ink layer partially formed on the substrate, and a surface protective layer which is present on and contacted with the low-luster pattern ink layer so as to cover a whole surface including both a region where the low-luster pattern ink layer is formed and a region where no low-luster pattern ink layer is formed, wherein the surface protective layer is formed by crosslinking and curing an ionizing radiation-curable resin composition, and a low-luster pattern ink forming the low-luster pattern ink layer contains a non-crosslinked urethane resin as a binder and the ionizing radiation-curable resin composition contains a (meth)acrylate monomer;

(3) the decorative material as described in the above aspect (2), wherein the low-luster pattern ink forming the low-luster pattern ink layer contains the non-crosslinked urethane resin and an unsaturated polyester resin as a binder;

(4) the decorative material as described in the above aspect (2) or (3), wherein the ionizing radiation-curable resin composition contains a (meth)acrylate monomer solely;

(5) the decorative material as described in any one of the above aspects (1) to (4), wherein the low-luster pattern ink forming the low-luster pattern ink layer has an uneven thickness;

(6) the decorative material as described in the above aspect (5), wherein the low-luster pattern ink layer has a thick film region having a relatively large thickness and a thin film region having a relatively small thickness, and a portion just above and in the vicinity of the thick film region is the low-gloss region having a relatively low gloss, whereas a portion just above and in the vicinity of the thin film region is the low-gloss region having a relatively high gloss;

(7) the decorative material as described in any one of the above aspects (1) to (6), wherein the surface protective layer contains fine particles, and an average particle size of the fine particles is close to a plus-side value of a maximum thickness of the surface protective layer located just above the low-luster pattern ink layer;

(8) the decorative material as described in the above aspect (7), wherein a coefficient of variation (CV value) of a particle size distribution of the fine particles which is represented by the formula: [(standard deviation of particle size/average particle size)×100] is 30% or lower;

(9) the decorative material as described in the above aspect (7) or (8), wherein the decorative material satisfies a relationship represented by the following formula (I):

$$1.05 \times t_M \leq d_A \leq t_G \quad (I)$$

wherein $d_A$ is an average particle size of the fine particles; $t_M$ is a maximum thickness of the surface protective layer located just above the low-luster pattern ink layer; and $t_G$ is a thickness of the surface protective layer present in a region where no low-luster pattern ink layer is formed;

(10) the decorative material as described in any one of the above aspects (7) to (9), wherein the surface protective layer contains the fine particles in an amount of 2 to 20% by mass;

(11) the decorative material as described in any one of the above aspects (1) to (10), wherein the surface protective layer is formed by crosslinking and curing the ionizing radiation-curable resin composition containing an ethyleneoxide-modified polymerizable compound, and contains particles of baked kaolin;

(12) the decorative material as described in any one of the above aspects (1) to (11), wherein the low-luster pattern ink forming the low-luster pattern ink layer contains an extender pigment;

(13) the decorative material as described in any one of the above aspects (1) to (12), wherein the ionizing radiation-curable resin composition is an electron beam-curable resin composition;

(14) the decorative material as described in any one of the above aspects (1) and (5) to (13), wherein a surface of the surface protective layer located above the low-gloss region has a convex shape;

(15) the decorative material as described in any one of the above aspects (1) to (14), further comprising a penetration-preventing layer formed between the substrate and the low-luster pattern ink layer;

(16) the decorative material as described in the above aspect (15), wherein the substrate is a penetrable substrate;

(17) the decorative material as described in any one of the above aspects (1) to (16), wherein a colored layer, a pattern layer and the penetration-preventing layer are successively laminated on the substrate, and the low-luster pattern ink layer as well as the surface protective layer which is present on and contacted with the low-luster pattern ink layer so as to cover a whole surface including both a region where the low-luster pattern ink layer is formed and a region where no low-luster pattern ink layer is formed, are successively formed on the laminated layers;

(18) the decorative material as described in the above aspect (17), wherein the pattern layer has a woodgrain pattern, and the low-luster pattern ink layer forms a low-gloss region corresponding to a vessel portion of the woodgrain pattern; and

(19) a decorative plate comprising a substrate plate and the decorative material as described in any one of the above aspects (1) to (18) which is attached onto the substrate.

BRIEF EXPLANATION OF REFERENCE NUMERALS

1: Decorative material; 2: Substrate; 3: Low-luster pattern ink layer; 3-*a*: Low-luster pattern ink; 3-*b*: Low-luster pattern ink; 3-*c*: Low-luster pattern ink; 4: Low-gloss region; 4-*a*:

Low-gloss region; 4-b: Low-gloss region; 4-c: Low-gloss region; 5: Surface protective layer; 6: Colored layer; 7: Pattern layer; 8: Penetration-preventing layer; 9: Convex shape; 10-a: Fine particles; 10-b: Fine particles; 11: Adhesive layer; 12: Substrate plate

PREFERRED EMBODIMENTS FOR CARRYING OUT THE INVENTION

The decorative material of the present invention includes at least a substrate, a low-luster pattern ink layer partially formed on the substrate, and a surface protective layer which is present on and contacted with the low-luster pattern ink layer so as to cover a whole surface including both a region where the low-luster pattern ink layer is formed and a region where no low-luster pattern ink layer is formed, wherein the surface protective layer is formed by crosslinking and curing an ionizing radiation-curable resin composition, and provided therein with a low-gloss region which is located in a portion just above the low-luster pattern ink layer and in the vicinity of the portion, and visually recognized as a concave portion.

Figure 1:
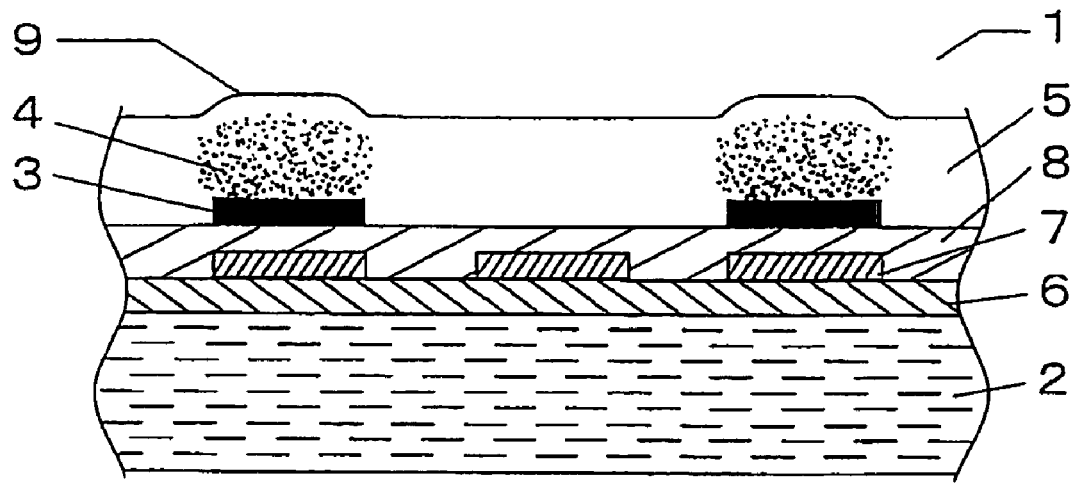
FIG. 1 is a schematic view showing a section of a decorative material according to the present invention.
Figure 2:
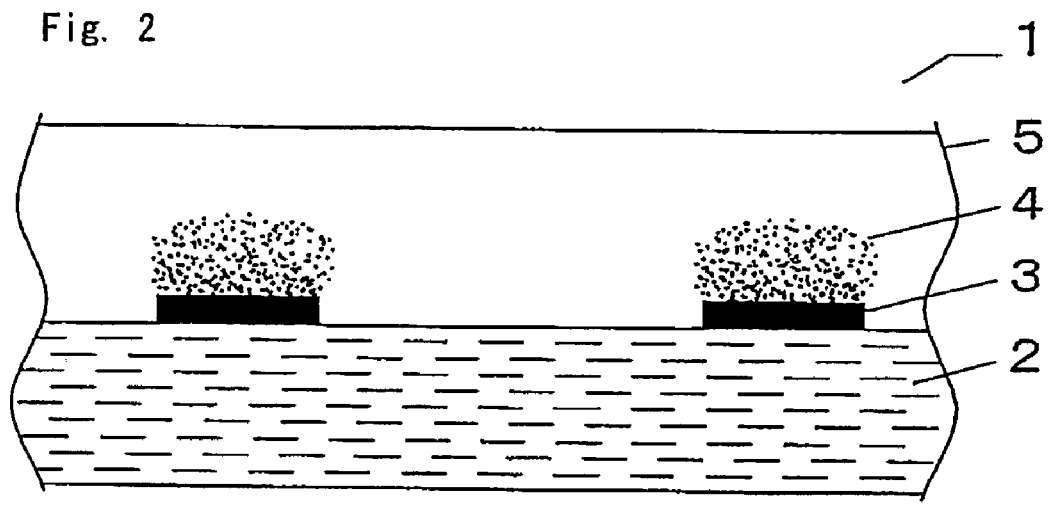
FIG. 2 is a schematic view showing a section of a decorative material according to the present invention.
Figure 3:
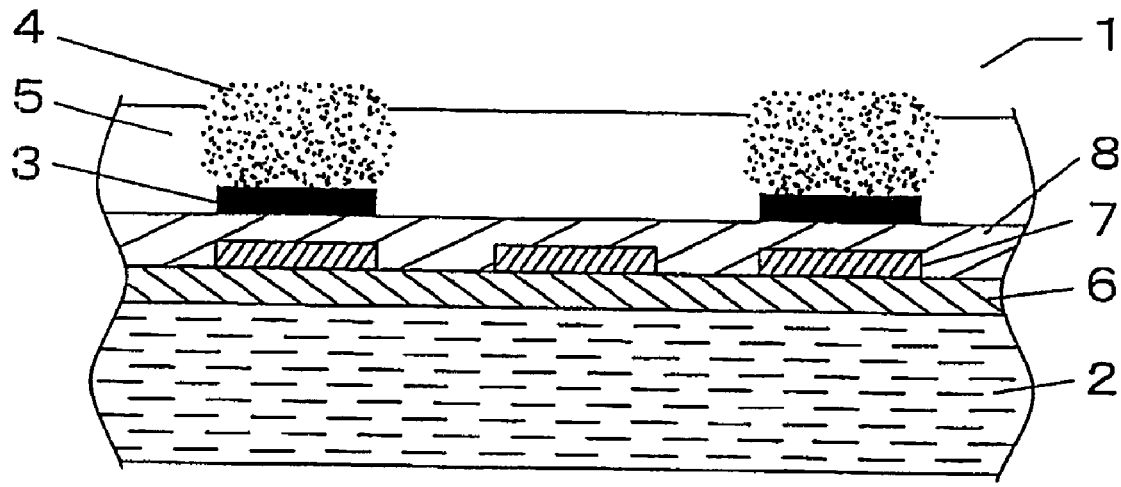
FIG. 3 is a schematic view showing a section of a decorative material according to the present invention.

The structure of the decorative material according to the present invention is described in detail by referring to FIGS. 1 to 3. FIGS. 1 to 3 are schematic views showing a decorative material 1 of the present invention. In the embodiment shown in FIG. 1, a colored layer 6 uniformly covering a whole surface of a substrate 2, a pattern layer 7, a uniform penetration-preventing layer 8, a low-luster pattern ink layer 3 and a surface protective layer 5 formed by crosslinking and curing an ionizing radiation-curable resin composition are successively laminated on the substrate 2 in this order. The low-luster pattern ink layer 3 is partially present, and a portion of the surface protective layer located just above the low-luster pattern ink layer and in the vicinity thereof forms a low-gloss region 4. When the decorative material of the present invention is viewed from the side of the surface protective layer 5, the low-gloss region 4 is visually recognized as a concave portion, whereas the other region is visually recognized as a convex portion, so that the surface of the decorative material can be visually recognized as a convexo-concave pattern as a whole due to the provision of the low-gloss region 4. Meanwhile, in the drawings, the low-gloss region 4 is represented by collection of points.

An outermost surface of the surface protective layer 5 which is located above the low-gloss region 4 may be raised up owing to formation of the low-luster pattern ink layer 3, and forms a convex shape 9. When such a convex shape is present on the surface of the surface protective layer 5, light scattering occurs thereon due to increase of the surface area, and an angle of visibility for recognizing the low gloss is also widened, thereby emphasizing a visual convexo-concave feeling in cooperation with the effect of the low-gloss region 4. Meanwhile, the height of the convex shape is not particularly limited as long as the effects of the present invention can be suitably exhibited, and is usually in the range of 2 to 3 μm.

Next, in the embodiment shown in FIG. 2, the low-luster pattern ink layer 3 is laminated on the substrate 2, and the surface protective layer 5 formed by crosslinking and curing an ionizing radiation-curable resin composition is laminated on the low-luster pattern ink layer 3. Similarly to the decorative material shown in FIG. 1, a portion of the surface protective layer located just above the low-luster pattern ink layer or in the vicinity thereof forms a low-gloss region 4. When the decorative material of the present invention is viewed from the side of the surface protective layer 5, the low-gloss region 4 partially present thereon is visually recognized as a concave portion, so that a convexo-concave pattern is recognized as a whole on the surface of the decorative material.

The extent of spread of the low-gloss region 4 formed in the surface protective layer 5 is not particularly limited as long as the effects of the present invention can be suitably exhibited. As shown in FIGS. 1 and 2, the low-gloss region 4 may extend from the surface of the low-luster pattern ink layer 3 in the thickness direction of the surface protective layer 5 and terminate at the mid thereof. Alternatively, as shown in FIG. 3, the low-gloss region 4 may reach the outermost surface of the surface protective layer 5. Further, as shown in FIG. 3, the low-gloss region 4 may be raised into a convex shape on the outermost surface of the surface protective layer 5.

Next, the substrate and the respective layers are described in detail by referring to FIGS. 1 to 9.

The substrate 2 used in the present invention is not particularly limited as long as it is ordinarily usable for decorative materials, and may be appropriately selected from various papers, plastic films, plastic sheets, metal foils, metal sheets, metal plates, wood plates such as timber, and ceramic-based materials according to the applications thereof. These materials may be used alone or in the form of a laminate composed of an optional combination thereof such as a composite of papers and a composite of a paper and a plastic film.

One or both surfaces of the substrate, in particular, a plastic film substrate or a plastic sheet substrate may be subjected to physical or chemical surface treatments such as those using oxidation method or convex/concave shaping method, if required, in order to enhance adhesion of the substrate to the layer to be laminated thereon.

Examples of the treatments using the oxidation method include a corona discharge treatment, a chromate treatment, a flame treatment, a hot air treatment and an ozone/ultraviolet treatment. Examples of the treatments using the convex/concave shaping method include a sand blast treatment and a solvent treatment. These surface treatments may be appropriately selectively conducted depending upon the kind of substrate used. In general, among these treatments, the corona discharge treatment is preferably used in view of good effects and facilitated operation thereof.

In addition, for the purposes of enhancement of interlaminar bonding strength between the substrate and the respective layers, etc., a primer layer may be formed on the substrate. Further, the substrate may be coated with a suitable paint to adjust a hue thereof, or may be formed thereon with a pattern in view of imparting a good design thereto.

Examples of various papers used as the substrate include thin cut sheet papers, kraft papers and titanium papers. These paper substrates may further contain resins such as acrylic resins, styrene-butadiene rubbers, melamine resins and urethane resins in order to enhance an interlaminar bonding strength between fibers of the paper substrate or between the paper substrate and the other layers or prevent formation of fuzzes (by either impregnation with the resins after papermaking or inclusion of the resins during paper-making). Examples of the resin-containing paper include interlaminar reinforced papers and resin-impregnated papers.

In addition to the above papers, as the substrate, there may be used various papers which are frequently employed in building applications, such as linter papers, paper boards, base papers for gypsum boards and raw fabrics for vinyl-based wall papers which are composed of a paper and a vinyl chloride resin layer formed on a surface of the paper. Further, as the substrate, there may also be used such papers employed in business applications or for ordinary printing and packaging purposes such as coated papers, art papers, parchment papers, glassine papers, paraffin papers and Japanese papers.

Although being distinguished from these papers, as the substrate, there may also be used woven fabrics and nonwoven fabrics of various fibers which have an appearance and properties similar to those of papers. Examples of various fibers include inorganic fibers such as glass fibers, asbestos fibers, potassium titanate fibers, alumina fibers, silica fibers and carbon fibers, and synthetic resin fibers such as polyester fibers, acrylic fibers and vinylon fibers.

The plastic film or the plastic sheet may be made of various synthetic resins. Examples of the synthetic resins include polyolefin resins such as polyethylene resins, polypropylene resins, polymethylpentene resins and olefin-based thermoplastic elastomers; vinyl-based resins such as polyvinyl chloride resins, polyvinylidene chloride resins, polyvinyl alcohol resins, vinyl chloride/vinyl acetate copolymer resins, ethylene/vinyl acetate copolymer resins and ethylene/vinyl alcohol copolymer resins; polyester resins such as polyethylene terephthalate resins, polybutylene terephthalate resins, polyethylene naphthalate/isophthalate copolymer resins and polyester-based thermoplastic elastomers; acrylic resins such as polymethyl (meth)acrylate resins, polyethyl (meth)acrylate resins and polybutyl (meth)acrylate resins; polyamide resins such as typically nylon 6 and nylon 66; cellulose-based resins such as cellulose triacetate resins and cellophane; polystyrene resins; polycarbonate resins; polyallylate resins; and polyimide resins.

Examples of the metal foil, metal sheet or metal plate include those made of aluminum, iron, stainless steel and copper, as well as those plated with these metals. Examples of various wood plates include veneer, plywood, laminated wood, particle board, and wood fiber plates such as MDF (medium-density fiber board). Examples of the ceramic materials include ceramic building materials such as gypsum boards, calcium silicate boards and wood chip cement boards; pottery; glass; porcelain enamel; and baked tile. Examples of the other substrate include composites of various materials such as fiber-reinforced plastic (FRP) plates, laminates obtained by attaching an iron plate on both surfaces of a paper honeycomb, and laminates obtained by sandwiching a polyethylene resin sheet between two aluminum plates.

The thickness of the substrate 2 is not particularly limited. The thickness of the plastic sheet substrate is usually about 20 to 150 μm and preferably 30 to 100 μm. The basic weight of the paper substrate is usually about 20 to 150 g/m$^2$ and preferably 30 to 100 g/m$^2$.

The colored layer 6 as shown in FIG. 1 which is formed so as to cover a whole surface of the substrate is provided for enhancing a design property of the decorative material according to the present invention, and may also be referred to as a concealing layer or a whole solid layer. Thus, the colored layer 6 serves for adjusting a color of a surface of the substrate 2, and is formed for coloring the surface of the substrate 2 as intended when the substrate 2 is unsuitably colored by itself or exhibits an uneven color. The colored layer usually has an opaque color in many cases, but may also show a tinted transparent color to utilize an original pattern of the underlying layer. In the case where a white color of the substrate 2 is utilized or the substrate 2 itself is suitably tinted, it is not required to provide the colored layer 6.

The ink used for forming the colored layer may be those produced by appropriately mixing a binder with a colorant such as pigments and dyes, an extender pigment, a solvent, a stabilizer, a plasticizer, a catalyst and a hardening agent. The binder is not particularly limited. Examples of the binder include polyurethane-based resins, vinyl chloride/vinyl acetate-based copolymer resins, vinyl chloride/vinyl acetate/ acrylic compound-based copolymer resins, chlorinated polypropylene-based resins, acrylic resins, polyester-based resins, polyamide-based resins, butyral-based resins, polystyrene-based resins, nitrocellulose-based resins and cellulose acetate-based resins. The binder may be optionally selected from these resins, and these resins may be used alone or in the form of a mixture of any two or more thereof.

Examples of the colorant used in the colored layer include inorganic pigments such as carbon black (Japanese ink), iron black, titanium white, antimony white, chrome yellow, titanium yellow, iron oxide red, cadmium red, ultramarine blue and cobalt blue; organic pigments and dyes such as quinacridone red, isoindolinone yellow and phthalocyanine blue; metallic pigments made of scale-like foil pieces of aluminum, brass, etc., and nacreous (pearl) pigments made of scale-like foil pieces of titanium dioxide-coated mica, basic lead carbonate, etc.

The thickness of the colored layer 6 is about 1 to 20 μm, and a so-called solid printing layer may be suitably used as the colored layer 6.

The pattern layer 7 shown in FIG. 1 serves for imparting a decorative design to the substrate 2, and is formed by printing various patterns with an ink using a printer. Examples of the patterns formed by the pattern layer 7 include woodgrain patterns, stone-grain patterns imitating the surface of rocks such as marble pattern (e.g., travertine marble pattern), cloth patterns imitating texture of cloth and fabric, tiling patterns, brick work patterns, and composite patterns thereof such as parquetry patterns and patchwork patterns. These patterns may be produced by multi-color printing with a process color including yellow, red, blue and black colors, or by multi-color printing with a special color using printing plates corresponding to individual colors of the pattern.

The pattern ink used for forming the pattern layer 7 may be the same as the ink used for forming the colored layer 6. Meanwhile, in the decorative material of the present invention, since the low-luster pattern ink layer 3 and the low-gloss region 4 as described in detail below are capable of imparting a decorative design thereto, the provision of the pattern layer 7 is not necessarily essential.

The penetration-preventing layer 8 shown in FIG. 1 may be optionally provided, and has a function of inhibiting penetration of a low-luster pattern ink used for forming the below-mentioned low-luster pattern ink layer 3 and an ionizing radiation-curable resin for forming the below-mentioned surface protective layer 5 into the substrate 2. In particular, the effect of the penetration-preventing layer 8 becomes more remarkable when the substrate 2 is made of a permeable material such as papers and nonwoven fabrics. Therefore, the penetration-preventing layer 8 may be formed between the substrate 2 and the low-luster pattern ink layer 3, for example, between the substrate 2 and the colored layer 6, between the colored layer 6 and the pattern layer 7 or between the pattern layer 7 and the low-luster pattern ink layer 3 as shown in FIG. 1. As the penetration-preventing layer 8, a uniform layer obtained by crosslinking and curing a curable resin which exhibits a good adhesion to the ionizing radiation-curable resin forming the surface protective layer 5 is usually provided between the pattern layer 7 and the low-luster pattern ink layer 3 as shown in FIG. 1, thereby not only allowing the surface of the colored layer 6, the pattern layer 7, etc., if formed on the substrate 2, to be smoothened, but also exhibiting the effect of enhancing a bonding strength of these layers to the low-luster pattern ink layer 3 and the surface protective layer 5.

Figure 4:
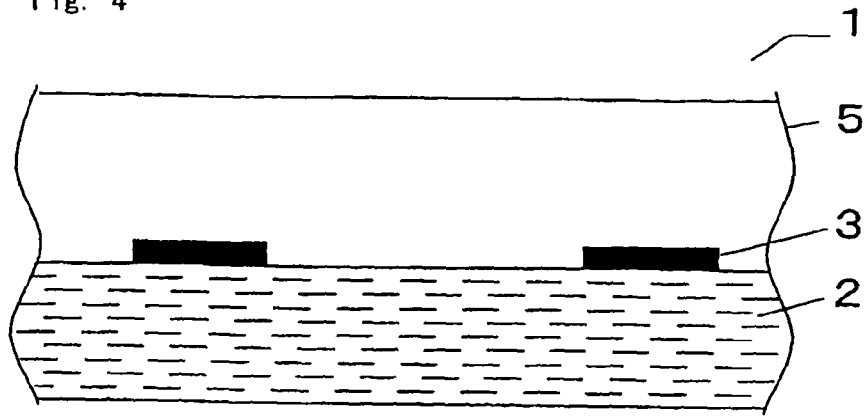
FIG. 4 is a schematic view showing a section of a decorative material according to the present invention.
Figure 5:
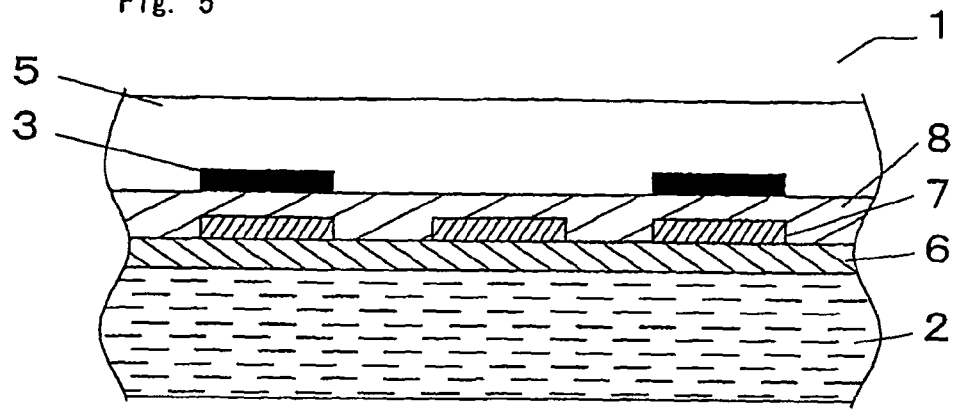
FIG. 5 is a schematic view showing a section of a decorative material according to the present invention.

In the decorative material of the present invention, the low-luster pattern ink layer 3 may be directly laminated on the substrate 2 as shown in FIG. 4, or may be laminated on the colored layer 6, the pattern layer 7, the penetration-preventing layer 8, etc., which may be optionally provided, as shown in FIG. 5. The low-luster pattern ink layer 3 serves for generating the difference in gloss of the pattern.

The mechanism of generation of the difference in gloss of the pattern according to the present invention is not clearly determined. However, from the results of various experiments, observations and measurements, it is suggested that by appropriately selecting combination of the respective materials and coating conditions upon application of an uncured ionizing radiation-curable resin for forming the surface protective layer 5 onto the surface of the low-luster pattern ink layer 3, the resin component of the low-luster pattern ink layer 3 and the surface protective layer are interacted with each other to cause partial elution, dispersion and mixing therebetween. In such a case, it is considered that the respective resin components of the ink contained in the low-luster pattern ink layer 3 and the uncured ionizing radiation-curable resin are not completely compatibilized with each other for a short period of time, but are kept in a suspended state and located in a portion just above the low-luster pattern ink layer 3 and in the vicinity of the portion, so that the suspended portion scatters light to form the low-gloss region. When the surface protective layer is crosslinked and cured while maintaining the suspended state, it is suggested that such a suspended state is fixed, so that the low-gloss region 4 is partially formed in the surface protective layer as shown in FIGS. 1 to 3, and recognized as a concave portion due to optical illusion.

The low-luster pattern ink forming the low-luster pattern ink layer 3 has a property capable of interacting with the ionizing radiation-curable resin composition for forming the surface protective layer 5 to cause elution, dispersion and mixing therebetween, and therefore may be appropriately determined in view of the relation with the (uncured) ionizing radiation-curable resin composition. More specifically, the low-luster pattern ink preferably contains a non-crosslinking resin as a binder resin. Examples of the suitable binder resin of the ink include thermoplastic (non-crosslinked type) urethane resins. In order to exhibit a still stronger interaction with the ionizing radiation-curable resin composition for forming the surface protective layer 5 and obtain a more remarkable difference in gloss of the pattern, the content of the urethane resin in the ink is preferably 50% by mass or higher.

The above urethane resin is preferably selected from non-crosslinked type resins, namely not those resins having a three-dimensionally crosslinked network molecular structure but thermoplastic resins having a linear molecular structure. The non-crosslinked type urethane resins may be produced by reacting a polyol such as acrylic polyols, polyester polyols and polyether polyols, with an isocyanate, e.g., aromatic isocyanates such as tolylene diisocyanate, xylene diisocyanate and diphenylmethane diisocyanate or aliphatic or alicyclic isocyanates such as isophorone diisocyanate, hexamethylene diisocyanate and hydrogenated tolylene diisocyanate. The number of hydroxyl groups per one molecule of the polyol and the number of isocyanate groups per one molecule of the isocyanate are each 2 as an average value. The average molecular weight of the urethane resin is preferably from about 10,000 to about 50,000, and the glass transition temperature (Tg) of the urethane resin is preferably from about −70 to about −40° C., in view of forming a suitable low-gloss region.

In addition, the binder resin of the low-luster pattern ink may also contain, if required, saturated or unsaturated polyester resins, acrylic resins or vinyl chloride/vinyl acetate copolymers in order to adjust the extent of formation of the low-gloss region and the contrast of difference in gloss between the low-gloss region and surrounding portions thereof. Among these resins, preferred are polyester resins, and more preferred are unsaturated polyester resins. The amount of the unsaturated polyester resins added is preferably from 10 to 50% by mass on the basis of a whole amount of the binder resin contained in the low-luster pattern ink. When the amount of the unsaturated polyester resins added is controlled to the above-specified range, a sufficient effect of enhancing formation of the low-gloss region can be attained. The unsaturated polyester resins are not particularly limited as long as they are reaction products of an unsaturated dicarboxylic acid and a glycol. Examples of the unsaturated dicarboxylic acid include maleic acid, fumaric acid and itaconic acid. Examples of the glycol include ethylene glycol, diethylene glycol, propylene glycol and butylene glycol.

The low-luster pattern ink forming the low-luster pattern ink layer 3 may contain a colorant similarly to those ink compositions used for forming the cored layer 6 and the pattern layer 7 to form a design pattern by itself. However, in the case where the colored layer 6 and the pattern layer 7 are provided as shown in FIG. 1, since the substrate 2 is already imparted with hues and patterns by these layers, the low-luster pattern ink composition forming the low-luster pattern ink layer 3 is not necessarily required to contain the colorant for tinting the layer. More specifically, when the pattern layer 7 is provided, the low-luster pattern ink layer 3 is coordinated with a portion of the pattern expressed by the pattern layer 7 which is to be delustered and visually recognized as a concave portion, thereby obtaining a pattern having the portion visually recognized as a concave portion due to the difference in gloss thereof. For example, if a woodgrain pattern is to be expressed by the pattern layer 7, the ink portion of the low-luster pattern ink layer 3 is coordinated with a vessel portion of the woodgrain pattern, thereby obtaining such a pattern in which the vessel portion is visually recognized as a concave portion due to the difference in gloss thereof. In addition, when a tiling pattern is to be expressed by the pattern layer 7, the ink portion of the low-luster pattern ink layer 3 is coordinated with a grooved joint portion of the tiling, thereby obtaining such a pattern in which the grooved joint portion is visually recognized as a concave portion due to the difference in gloss thereof.

Further, the low-luster pattern ink composition for forming the low-luster pattern ink layer 3 preferably contains an extender pigment. The inclusion of the extender pigment allows the low-luster pattern ink composition to exhibit a thixotropic property. As a result, when printing the low-luster pattern ink layer 3 using a printing plate, the shape of the low-luster pattern ink composition applied thereto can be maintained, so that a sharpness of the convexo-concave shape at an end portion at which transition between convex and concave portions is made, can be emphasized, thereby enabling sharp expression of the design pattern.

The extender pigment used in the present invention is not particularly limited, and may be appropriately selected from silica, talc, clay, barium sulfate, barium carbonate, calcium sulfate, calcium carbonate, magnesium carbonate, etc. Among these extender pigments, preferred is silica because the silica has a high freedom of selection of material as to oil absorption, particle size and pore volume and is excellent in designing property, whiteness and coatability as an ink, and more preferred is a silica powder. The particle size of silica is preferably 0.1 to 5 μm. The ink containing silica having a particle size of 0.1 μm or larger is prevented from exhibiting an extremely high thixotropic property and a too high viscosity, resulting in facilitated control of printing therewith. Also, when it is intended to express the vessel pattern as a delustered portion, if the particle size of silica is smaller than a thickness of the ink coating layer of the vessel pattern portion which is usually 5 μm or smaller, protrusion of the silica particles on a surface of the ink coating layer is relatively suppressed and the protruded particles are unnoticeable, thereby preventing occurrence of visually strange feeling.

The content of the extender pigment in the low-luster pattern ink composition is preferably in the range of 5 to 15% by mass. The low-luster pattern ink composition containing the extender pigment in an amount of 5% by mass or more can exhibit a sufficient thixotropic property, whereas the low-luster pattern ink composition containing the extender pigment in an amount of 15% by mass or less is completely free from deterioration in the effect of imparting a low gloss.

The coating amount of the low-luster pattern ink for forming the low-luster pattern ink layer 3 is preferably in the range of 1 to 30 g/m². When the coating amount of the low-luster pattern ink is 1 g/m² or more, the above-described interaction between the low-luster pattern ink and the ionizing radiation-curable resin composition suitably takes place to form a sufficient low-gloss region, thereby producing a sufficient difference in gloss on the surface of the resultant decorative material. On the other hand, when the coating amount of the low-luster pattern ink is 30 g/m² or less, the printing with the low-luster pattern ink can be made without any mechanical limitations, resulting in economical advantage. From these viewpoints, the coating amount of the low-luster pattern ink is more preferably from 2 to 20 g/m² and still more preferably from 5 to 10 g/m².

Further, by varying the coating amount of the low-luster pattern ink composition, the obtained low-luster pattern ink layer 3 has an uneven ink thickness, thereby allowing the extent of the portion visually recognized as a concave portion to be stepwise or continuously changed. As a result, the obtained decorative material can exhibit a gradation pattern with the difference in gloss which is changed stepwise, or a continuous pattern with the difference in gloss which is changed continuously.

The reason therefor is considered to be that as the coating amount of the low-luster pattern ink layer 3 is relatively increased, the interaction between the low-luster pattern ink layer 3 and the surface protective layer 5 is relatively enhanced, so that the extent of a suspended condition between the layers is increased, thereby further lowering the gloss of the low-gloss region 4.

Figure 6:
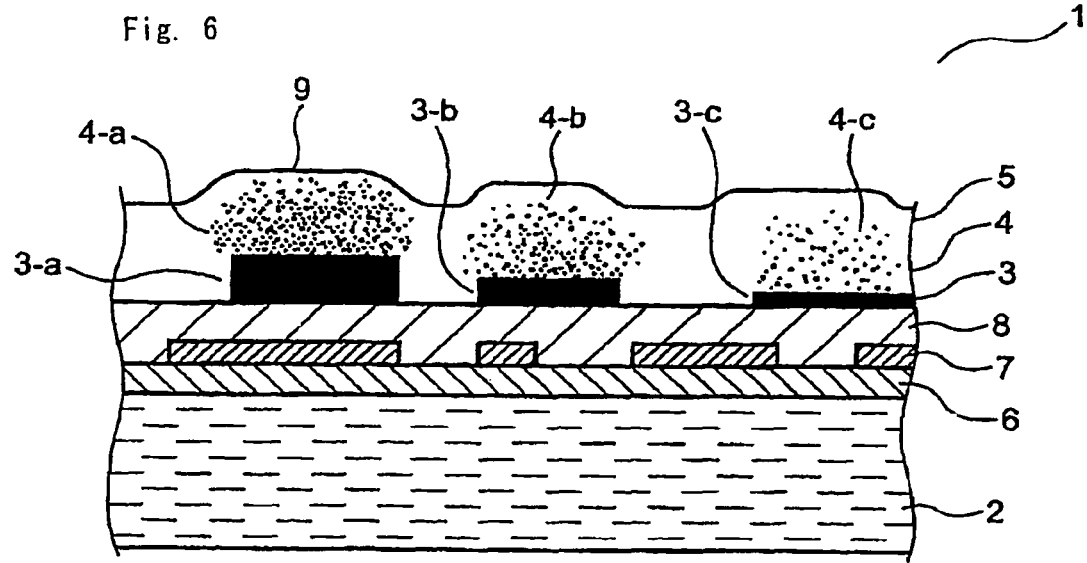
FIG. 6 is a schematic view showing a section of a decorative material according to the present invention.

The decorative material of the present invention is further explained in detail by referring to FIGS. 6 to 9. In FIG. 6, the respective portions of low-luster pattern ink layer 3, that is, a first sub-layer 3-a, a second sub-layer 3-b, a third sub-layer 3-c, forming the low-luster pattern ink layer 3, are different in thickness from each other. More specifically, the thicknesses of the respective ink coating layers of the low-luster pattern layer 3 are relatively reduced in the order of the sub-layers 3-a, 3-b and 3-c. The difference in thickness between the respective ink coating layers of the low-luster pattern layer 3 allows visual concave portions 4-a, 4-b and 4-c in the visual convexo-concave pattern obtained owing to existence of the low-gloss region 4 to be changed in gloss stepwise. As a result, the visual depths of the concave portions 4-c, 4-b and 4-a are stepwise increased in this order. The reason therefor is considered to be that since the respective sub-layers forming the low-luster pattern layer 3 are uneven in coating thickness, i.e., are coated such that the thicknesses thereof are reduced in the order of 3-a, 3-b and 3-c, the portion with a larger ink thickness shows a relatively low gloss whereas the portion with a small ink thickness shows a relatively high gloss, so that the gloss of the low-luster pattern layer 3 is stepwise changed in the order to 3-a, 3-b and 3-c. Thus, if the ink thickness is varied at further narrow intervals, the pattern can be observed such that the gloss thereof is changed continuously.

The above structure allows the resultant decorative material to exhibit further various textures. The thickness of the ink forming the low-luster pattern ink layer 3 may be readily varied usually by changing the coating amount of the ink. When the coating amount of the ink is continuously varied, the gloss of the pattern may be changed not stepwise but continuously.

Figure 7:
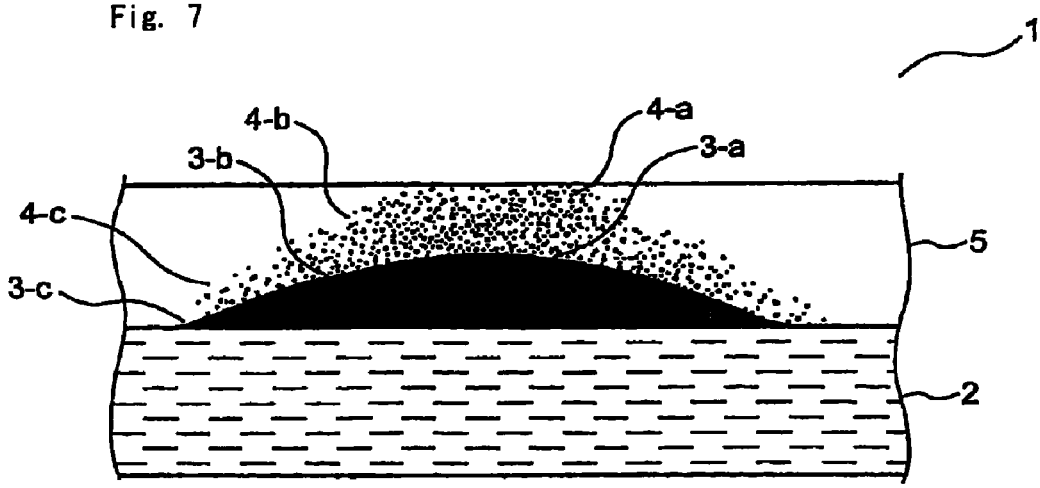
FIG. 7 is a schematic view showing a section of a decorative material according to the present invention.

Next, in the embodiment as shown in FIG. 7, the low-luster pattern ink layer 3 is laminated on the substrate 2 such that the thickness thereof is continuously changed in a plane parallel with the surface of the substrate (i.e., the thickness is large in a central portion of the layer, and is continuously reduced toward a side portion thereof), and the surface protective layer 5 obtained by crosslinking and curing the ionizing radiation-curable resin composition is further laminated thereover. Similarly to the decorative material shown in FIG. 6, a portion of the surface protective layer which is located just above the low-luster pattern ink layer and in the vicinity thereof forms the low-gloss region. In the embodiment shown in FIG. 7, the gloss values of the low-gloss regions 4-a, 4-b and 4-c are continuously lowered in this order as the thicknesses of portions 3-c, 3-b and 3-a of the low-luster pattern ink layer are continuously increased in this order. As a result, the visual concave depths of the respective low-gloss regions are continuously increased in the same order. When the decorative material is viewed from the side of the surface protective layer 5, the low-gloss region is visually recognized as a concave portion whereas the other region is visually recognized as a convex portion, thereby realizing a convexo-concave pattern as a whole.

Figure 8:
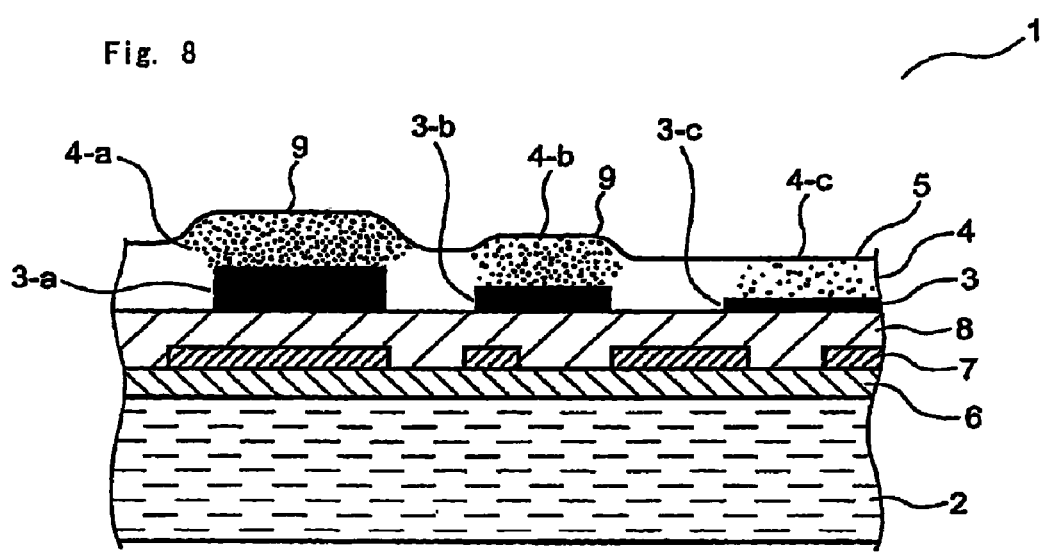
FIG. 8 is a schematic view showing a section of a decorative material according to the present invention.
Figure 9:
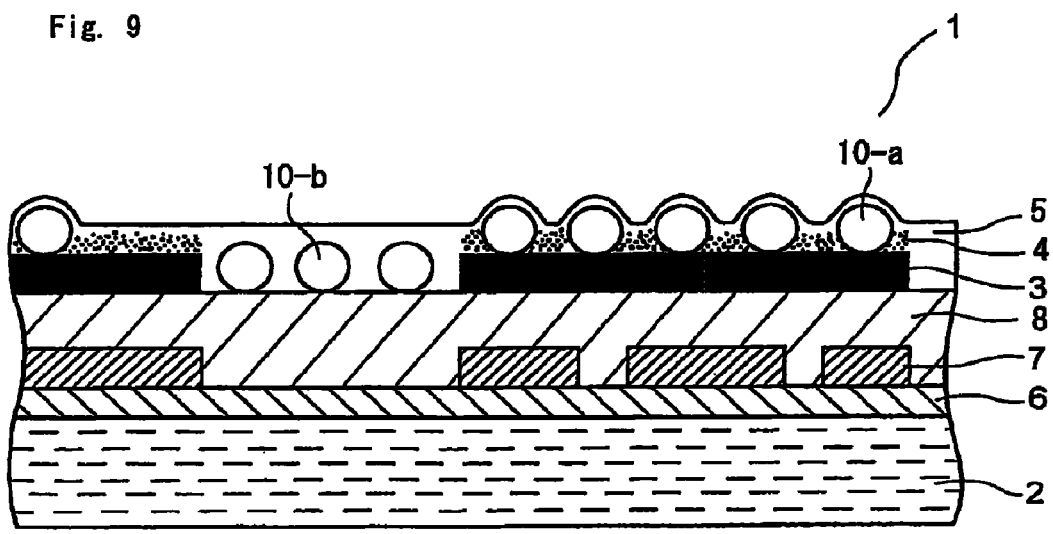
FIG. 9 is a schematic view showing a section of a decorative material according to the present invention.

The extent of spread of the low-gloss region 4 formed in the surface protective layer 5 is not particularly limited as long as the effects of the present invention are suitably exhibited. As shown in FIG. 6, the low-gloss region may extend from the surface of the low-luster pattern ink layer 3 and may terminate in the mid of the thickness direction thereof. Alternatively, as shown in FIGS. 7 and 8, the low-gloss region may reach the outermost surface of the surface protective layer 5. Further, as shown in FIG. 8, the low-gloss region may form a convex shape on the outermost surface of the surface protective layer 5.

The surface protective layer 5 is formed by crosslinking and curing the ionizing radiation-curable resin composition as described above. The ionizing radiation-curable resin composition used herein means a resin composition having energy quanta capable of crosslinking and polymerizing molecules thereof when exposed to electromagnetic wave or charged particle beam, namely such a resin composition capable of undergoing crosslinking and curing reactions upon irradiating an ultraviolet ray or an electron beam thereto. More specifically, the ionizing radiation-curable resin composition may be appropriately selected from polymerizable monomers and polymerizable oligomers or prepolymers thereof which are conventionally used as an ionizing radiation-curable resin composition.

Typical examples of the suitable polymerizable monomers include (meth)acrylate monomers containing a radical-polymerizable unsaturated group in a molecule thereof. When such a (meth)acrylate monomer is contained in the ionizing radiation-curable resin composition, the above interaction between the surface protective layer and the low-luster pattern ink layer can be generated, resulting in occurrence of suitable difference in gloss of the pattern. In order to attain a stronger interaction between the surface protective layer and the low-luster pattern ink layer and obtain a larger difference in gloss, the content of the (meth)acrylate monomer in the ionizing radiation-curable resin composition is preferably 50% by mass or larger, and the ionizing radiation-curable resin composition is more preferably made of the (meth) acrylate monomer solely.

The (meth)acrylate monomers are preferably polyfunctional (meth)acrylates. Meanwhile, the term "(meth)acrylate" used herein means an acrylate, a methacrylate or both thereof. The polyfunctional (meth)acrylates are not particularly limited as long as they have two or more ethylenically unsaturated bonds in a molecule thereof. Specific examples of the polyfunctional (meth)acrylates include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, neopentyl glycol di(meth)acrylate hydroxypivalate, dicyclopentenyl di(meth)acrylate, caprolactone-modified dicyclopentenyl di(meth)acrylate, ethyleneoxide-modified phosphoric acid di(meth)acrylate, allylated cyclohexyl di(meth)acrylate, isocyanurate di(meth)acrylate, trimethylolpropane tri(meth)acrylate, ethyleneoxide-modified trimethylolpropane tri(meth)acrylate, dipentaerythritol tri(meth)acrylate, propionic acid-modified dipentaerythlitol tri(meth)acrylate, pentaerythritol tri(meth)acrylate, propyleneoxide-modified trimethylolpropane tri(meth)acrylate, tris (acryloxyethyl) isocyanurate, propionic acid-modified dipentaerythritol penta(meth)acrylate, dipentaerythlitol hexa (meth)acrylate, ethyleneoxide-modified dipentaerythritol hexa(meth)acrylate and caprolactone-modified dipentaerythritol hexa(meth)acrylate. These polyfunctional (meth)acrylates may be used alone or in combination of any two or more thereof.

In the present invention, for the purpose of reducing a viscosity of the polyfunctional (meth)acrylate, a monofunctional (meth)acrylate may be appropriately used in combination with the polyfunctional (meth)acrylate unless the effects of the present invention are adversely affected. Examples of the monofunctional (meth)acrylate include methyl (meth) acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate and isobornyl (meth)acrylate. These monofunctional (meth)acrylates may be used alone or in combination of any two or more thereof.

As the polymerizable oligomer, there may be used oligomers having a radical-polymerizable unsaturated group in a molecule thereof. Examples of the polymerizable oligomers include epoxy (meth)acrylate-based oligomers, urethane (meth)acrylate-based oligomers, polyester (meth)acrylate-based oligomers and polyether. (meth)acrylate-based oligomers. The epoxy (meth)acrylate-based oligomers may be produced, for example, by esterifying an oxirane ring of a relatively low-molecular weight bisphenol-type epoxy resin or novolak-type epoxy resin with (meth)acrylic acid. In addition, there may also be used carboxyl-modified epoxy (meth) acrylate oligomers obtained by partially modifying the above epoxy (meth)acrylate-based oligomers with a dibasic carboxylic anhydride. The urethane (meth)acrylate-based oligomers may be produced, for example, by esterifying a polyurethane oligomer obtained by reacting a polyether polyol or a polyester polyol with polyisocyanate, with (meth)acrylic acid. The polyester (meth)acrylate-based oligomers may be produced, for example, by esterifying a hydroxyl group of a polyester oligomer having hydroxyl groups at both terminal ends thereof which is obtained by condensation between a polycarboxylic acid and a polyhydric alcohol, with (meth) acrylic acid, or by esterifying a terminal hydroxyl group of an oligomer obtained by adding an alkyleneoxide to a polycarboxylic acid, with (meth)acrylic acid. The polyether (meth) acrylate-based oligomers may be produced, for example, by esterifying a hydroxyl group of a polyether polyol with (meth)acrylic acid.

Examples of the other polymerizable oligomers include polybutadiene (meth)acrylate-based oligomers having a high hydrophobic property which is in the form of a polybutadiene oligomer having a (meth)acrylate group in a side chain thereof, silicone (meth)acrylate-based oligomers having a polysiloxane bond in a main chain thereof, aminoplast resin (meth)acrylate-based oligomers obtained by modifying an aminoplast resin having a large number of reactive groups in a small molecule thereof and oligomers having a cation-polymerizable functional group in a molecule thereof such as a novolak-type epoxy resin, a bisphenol-type epoxy resin, an aliphatic vinyl ether and an aromatic vinyl ether.

In the present invention, as described above, it is important that the low-luster pattern ink for forming the low-luster pattern ink layer 3 and the ionizing radiation-curable resin composition for forming the surface protective layer 5 are interacted with each other. Therefore, the suitable ink and ionizing radiation-curable resin composition are selected in view of good interaction therebetween. The ionizing radiation-curable resin composition preferably contains a polyfunctional (meth)acrylate monomer.

In addition, the ionizing radiation-curable resin used in the surface protective layer 5 preferably contains an ethyleneoxide-modified polymerizable compound, and the surface protective layer preferably contains baked kaolin particles. The inclusion of the ethyleneoxide-modified polymerizable compound in the ionizing radiation-curable resin allows the resultant surface protective layer to exhibit an improved oil resistance, and the inclusion of the baked kaolin particles in the surface protective layer allows the layer to exhibit an improved marring resistance. More specifically, as to the oil resistance, when the surface protective layer is constituted of the ionizing radiation-curable resin containing the ethyleneoxide-modified polymerizable compound, an affinity of the surface protective layer to oils can be lowered owing to a hydrophilic property of an ethyleneoxide moiety of the compound. As a result, oils such as edible oils which are attached onto the surface protective layer are prevented from being penetrated into the surface protective layer, thereby allowing the resultant decorative material to be improved in oil resistance by the effect of the surface protective layer itself.

The ethyleneoxide-modified polymerizable compound is such a compound which is capable of undergoing a polymerization reaction when exposed to an ionizing radiation, and contains an ethyleneoxide-modified moiety. The suitable ethyleneoxide-modified polymerizable compound may be appropriately used according to applications of the decorative material. Specific examples of the ethyleneoxide-modified polymerizable compound include trimethylolpropane ethyleneoxide-modified tri(meth)acrylate and bisphenol A ethyleneoxide-modified di(meth)acrylate.

With the increase in chain number n (per molecule) of ethyleneoxide repeating units in the ethyleneoxide-modified moiety, the oil resistance of the surface protective layer is increased, but on the contrary, the surface protective layer is deteriorated in water resistance and stain resistance to aqueous contaminants such as water-based inks due to the increased hydrophilicity. Therefore, the chain number n of ethyleneoxide repeating units in the ethyleneoxide-modified moiety may be appropriately adjusted in view of good balance between these properties. For example, the chain number n of ethyleneoxide repeating units in the ethyleneoxide-modified moiety is preferably from 2 to 20 and more preferably from 4 to 15. Meanwhile, the ethyleneoxide-modified polymerizable compound may be a difunctional, trifunctional or other functional, for example, tetra- or higher functional compound. The functionality of the ethyleneoxide-modified polymerizable compound may be appropriately determined according to hardness of the coating film or the like as required for the surface protective layer.

In the ionizing radiation-curable resin used in the surface protective layer 5, a whole amount of the resin components capable of undergoing a polymerization reaction when exposed to an ionizing radiation may be constituted of the ethyleneoxide-modified polymerizable compound. However, in view of other properties than oil resistance, for example, stain resistance to water-based inks on the surface of the surface protective layer, etc., the other ionizing radiation-polymerizable compounds may be appropriately used in combination with the ethyleneoxide-modified polymerizable compound. More specifically, when the ionizing radiation-curable resin is composed of the ethyleneoxide-modified polymerizable compound solely, the surface protective layer is enhanced in oil resistance owing to the increased hydrophilicity, but tends to be deteriorated in stain resistance to aqueous contaminants such as water-based inks owing to increased affinity to aqueous substances. In such a case, a non-hydrophilic polymerizable compound, for example, an ethyleneoxide-unmodified acrylate monomer and/or a prepolymer thereof (ordinary acrylate monomer and/or its prepolymer) may be blended with the ethyleneoxide-modified polymerizable compound. In order to attain both the oil resistance and the stain resistance to aqueous contaminants, the blending ratio (mass ratio) of the ethyleneoxide-modified polymerizable compound to the ethyleneoxide-unmodified polymerizable compound is preferably in the range of from 3/7 to 5/5. Although propyleneoxide belongs to alkyleneoxide compounds similarly to the ethyleneoxide, if the propyleneoxide-modified compound is used in place of the ethyleneoxide-modified compound, the relative ratio of ether bonds contained in the ionizing radiation-curable resin tends to be reduced, and the tendency of increase in hydrophilicity is lowered, thereby failing to obtain a good oil resistance.

When an ultraviolet-curable resin composition is used as the ionizing radiation-curable resin composition, a photopolymerization initiator is preferably added thereto in an amount of about 0.1 to 5 parts by mass on the basis of 100 parts by mass of the resin composition. The photopolymerization initiator may be appropriately selected from conventionally used ones without particular limitations. Examples of the photopolymerization initiator used for polymerizable monomers or polymerizable oligomers containing a radical-polymerizable unsaturated bond in a molecule thereof include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenyl benzophenone, 4,4'-diethylaminobenzophenone, dichlorobenzophenone, 2-methyl anthraquinone, 2-ethyl anthraquinone, 2-tert-butyl anthraquinone, 2-aminoanthraquinone, 2-methyl thioxanthone, 2-ethyl thioxanthone, 2-chlorothioxanthone, 2,4-dimethyl thioxanthone, 2,4-diethyl thioxanthone, benzyl dimethyl ketal and acetophenone dimethyl ketal.

Examples of the photopolymerization initiator used for polymerizable oligomers containing a cation-polymerizable functional group in a molecule thereof, etc., include aromatic sulfonium salts, aromatic diazonium salts, aromatic iodonium salts, metallocene compounds, and benzoin sulfonic esters.

Also, examples of a photosensitizer usable in the ionizing radiation-curable resin composition include p-dimethyl benzoate, tertiary amines and thiol-based sensitizers.

In the present invention, an electron beam-curable resin composition is preferably used as the ionizing radiation-curable resin composition. The electron beam-curable resin composition can be used under a solvent-free condition and is therefore favorable in view of environmental protection and human health, and further can exhibit a stable curing property without requiring any photopolymerization initiator.

In the decorative material of the present invention, fine particles are preferably blended in the ionizing radiation-curable resin composition. As the fine particles, there may be used those particles having an average particle size which is close to a plus-side value of a maximum thickness of the surface protective layer 5 located just above the low-luster pattern ink layer 3. The decorative material blended with the fine particles according to the present invention is explained in detail by referring to FIG. 9. In the decorative material shown in FIG. 9, the fine particles are blended in the ionizing radiation-curable resin composition.

The fine particles 10 (10-a and 10-b) blended in the surface protective layer have an average particle size $d_A$ which is close to a plus-side value of a maximum thickness $t_M$ of the surface protective layer 5 located just above the low-luster pattern ink layer 3, i.e., $d_A$ is slightly larger than $t_M$. As a result, the fine particles 10-a are protruded on the surface of the surface protective layer 5 located just above the low-luster pattern ink layer 3. The surface portion of the surface protective layer on which the fine particles are protruded has a convex shape and therefore undergoes light scattering. Simultaneously with the light scattering, inside of the surface protective layer 5, the low-gloss region 4 which is visually recognized as a concave portion, is formed in a portion located just above the low-luster pattern ink layer 3 and in the vicinity of the portion due to the interaction between the low-luster pattern ink in the low-luster pattern ink layer 3 and the ionizing radiation-curable resin composition forming the surface protective layer 5.

On the other hand, the fine particles 10-b located in a portion other than the portion just above the low-luster pattern ink layer 3 are not protruded from the surface of the surface protective layer and therefore exhibit no light scattering effect unlike the fine particles 10-a.

Therefore, owing to the synergistic effect of the low-gloss region 4 in the surface protective layer 5 and the light scattering due to the protruded fine particles on the surface of the surface protective layer 5 as well as the effect of the convex shape produced by forming the above low-luster pattern ink layer 3, the visual convexo-concave feeling of the decorative material is further emphasized.

Meanwhile, the maximum thickness $t_M$ of the surface protective layer 5 located just above the low-luster pattern ink layer 3 means the thickness of the surface protective layer 5 itself when any convex shape produced by forming the low-luster pattern ink layer 3 is not present. Whereas, when the convex shape is formed, the maximum thickness $t_M$ means the thickness including a height of the protrusion.

The particle size distribution of the fine particles is preferably closer to a monodisperse system, since the amount of the fine particles used is more readily controlled, and the above aimed effects can be suitably exhibited even when the fine particles are used in a small amount.

In the present invention, a coefficient of variation (CV value) of particle size distribution of the fine particles which is represented by the formula: [(standard deviation of particle size/average particle size)×100] is preferably 30% or lower. The fine particles having a CV value of 30% or lower have a practically acceptable particle size distribution and can sufficiently exhibit the above aimed effects even when used in a reasonable amount. The CV value of the fine particles is preferably 20% or lower and more preferably 15% or lower.

Further, the fine particles preferably satisfy the relationship represented by the following formula:

$$1.05 \times t_M \leq d_A \leq t_G \tag{I}$$

wherein $d_A$ is an average particle size of the fine particles; $t_M$ is a maximum thickness of the surface protective layer located just above the low-luster pattern ink layer; and $t_G$ is a thickness of the surface protective layer located in a region where no low-luster pattern ink layer is formed.

When the average particle size $d_A$ of the fine particles is $1.05 \times t_M$ or larger, even though the fine particles are submerged into the low-luster pattern ink layer, the fine particles are protruded on the surface of the surface protective layer located just above the low-luster pattern ink layer, so that the above aimed effects can be sufficiently exhibited. Also, when $d_A$ is not more than $t_G$, the fine particles are prevented from being protruded on the surface of the surface protective layer in the region where no low-luster pattern ink layer is present.

The shape of the fine particles is not particularly limited, and may be a spherical shape, an ellipsoidal shape or a polyhedral shape. Among these fine particles, preferred are spherical particles. Meanwhile, in the present invention, the particle size of the fine particles having the other shape than a spherical shape means a value represented by a diameter of a circumscribed sphere.

The content of the fine particles in the surface protective layer varies depending upon the average particle size and CV value of particle size distribution thereof, and is usually selected from the range of 2 to 20% by mass. When the content of the fine particles is 2% by mass or more, the aimed effects due to inclusion of the fine particles can be suitably exhibited. When the content of the fine particles is 20% by mass or less, the pattern formed on the surface of the decorative material has a good visibility. The content of the fine particles in the surface protective layer is preferably 4 to 16% by mass and more preferably 4 to 13% by mass.

The fine particles may be either inorganic fine particles or organic fine particles. In view of a good visibility of the pattern formed on the surface of the decorative material, the fine particles preferably has a good transparency. Examples of the inorganic fine particles include particles of silica, alumina, aluminosilicate, kaolinite, calcium carbonate, barium sulfate and glass. Examples of the organic fine particles include particles of acrylic resins, polycarbonate resins, urethane-based resins, urea-based resins, benzoguanamine resins, and condensates of benzoguanamine, melamine and formaldehyde.

These fine particles may be used alone or in combination of any two or more thereof. Among these fine particles, silica particles are preferred in view of a good transparency and the aimed effects of the present invention.

The ionizing radiation-curable resin composition used in the present invention may also contain various additives according to required properties of the obtained cured resin layer. Examples of the additives include weather resistance-improving agents, abrasion resistance-improving agents, polymerization inhibitors, crosslinking agents, infrared-absorbing agents, antistatic agents, adhesion-improving agents, leveling agents, thixotropic agents, coupling agents, plasticizers, antifoaming agents, fillers, solvents and colorants.

As the weather resistance-improving agents, there may be used ultraviolet-absorbing agents or light stabilizers. The ultraviolet absorbing agents may be either inorganic or organic compounds. As the preferred inorganic ultraviolet absorbing agents, there may be used particles of titanium oxide, cerium oxide or zinc oxide which have an average particle size of about 5 to 120 nm. As the organic weather resistance-improving agents, there may be used benzotriazole-based compounds. Specific examples of the benzotriazole-based compounds include 2-(2-hdyroxy-5-methylphenyl)benzotriazole, 2-(2-hydroxy-3,5-di-tert-aminophenyl)benzotriazole and 3-[3-(benzotriazol-2-yl)-5-tert-butyl-4-hydroxyphenyl]propionic ester of polyethylene glycol. Also, examples of the light stabilizer include hindered amine-based compounds. Specific examples of the light stabilizer include bis(1,2,2,6,6-pentamethyl-4-piperizyl) 2-(3,5-di-tert-butyl-4-hydroxybenzyl)-2'-n-butyl malonate, bis(1,2,2,6,6-pentamethyl-4-piperidyl) sebacate and tetrakis(2,2,6,6-tetramethyl-4-piperidyl)-1,2,3,4-butanetetracarboxylate. In addition, as the ultraviolet absorbing agent or the light stabilizer, there may also be used reactive ultraviolet absorbing agents or light stabilizers having a polymerizable group such as a (meth)acryloyl group in a molecule thereof.

Examples of the inorganic abrasion resistance-improving agent include spherical particles of a-alumina, silica, kaolinite, iron oxide, diamond and silicon carbide. The shape of the inorganic abrasion resistance-improving agent may be a spherical shape, an ellipsoidal shape, a polyhedral shape or a scale-like shape. Among these shapes, preferred is the spherical shape although not particularly limited thereto. Examples of the organic abrasion resistance-improving agent include beads of synthetic resins such as crosslinked acrylic resins and polycarbonate resins. The particle size of the abrasion resistance-improving agent may be usually 30 to 200% of a thickness of the cure resin layer. Among these abrasion resistance-improving agents, spherical α-alumina particles are especially preferred because of high hardness, large effect of improving the abrasion resistance and relatively easy production of the spherical particles.

Examples of the polymerization inhibitor include hydroquinone, p-benzoquinone, hydroquinone monomethyl ether, pyrogallol and t-butyl catechol. Examples of the crosslinking agent used in the present invention include polyisocyanate compounds, epoxy compounds, metal chelate compounds, aziridine compounds and oxazoline compounds.

Examples of the filler include barium sulfate, talc, clay, calcium carbonate and aluminum hydroxide.

Examples of the colorant include known coloring pigments such as quinacridon red, isoindolinone yellow, phthalocyanine blue, phthalocyanine green, titanium oxide and carbon black.

Examples of the infrared-absorbing agent include dithiol-based metal complexes, phthalocyanine-based compounds and diimmonium compounds.

In the present invention, the above polymerizable monomers or polymerizable oligomers as the ionizing radiation-curable component and various additives are intimately mixed with each other at a given mixing ratio to prepare a coating solution composed of the ionizing radiation-curable resin composition. The viscosity of the coating solution is not particularly limited, and may be determined so as to form an cured resin layer on a surface of the substrate by the below-mentioned coating method.

In the present invention, the thus prepared coating solution is applied onto a surface of the substrate in an amount capable of providing a cured coating layer having a thickness of 1 to 20 μm, by known methods such as gravure coating, bar coating, roll coating, reverse roll coating and Komma coating, preferably gravure coating, thereby forming an uncured resin layer thereon. The cured coating layer having a thickness of 1 μm or larger can exhibit good functions as required. The thickness of the cured surface protective layer is preferably about 2 to 20 μm.

In the present invention, the thus formed uncured resin layer is irradiated with an ionizing radiation such as an electron beam and an ultraviolet ray to cure the uncured resin layer. When electron beam is used as the ionizing radiation, an acceleration voltage for the electron beam may be appropriately determined according to the kind of resin used and the thickness of the resin layer, and the uncured resin layer is preferably cured by applying an acceleration voltage of usually about 70 to 300 kV thereto.

Meanwhile, upon irradiation of the electron beam, the higher the acceleration voltage becomes, the higher the penetrability of the electron beam can be attained. Therefore, when using a substrate which tends to be deteriorated by exposure to the electron beam, the acceleration voltage may be controlled such that the depth of penetration of the electron beam is substantially identical to the thickness of the resin layer, thereby inhibiting an excessive amount of the electron beam from being irradiated to the substrate and minimizing deterioration of the substrate by irradiation with an excessive amount of the electron beam.

The exposure dose of the electron beam is preferably such an amount capable of saturating a crosslinking density of the resin layer, and may be selected from the range of usually 5 to 300 kGy (0.5 to 30 Mrad) and preferably 10 to 50 kGy (1 to 5 Mrad).

The electron beam source is not particularly limited, and examples of the electron beam source usable in the present invention include various electron beam accelerators such as Cockroft-Walton type, van de Graaff type, resonance transformer type, insulating core transformer type, linear type, Dynamitron type and high-frequency type.

When an ultraviolet ray is used as the ionizing radiation, the ultraviolet ray to be irradiated may have a wavelength of 190 to 380 nm. The ultraviolet ray source is not particularly limited, and examples of the ultraviolet ray source usable in the present invention include a high-pressure mercury lamp, a low-pressure mercury lamp, a metal halide lamp and a carbon arc lamp.

The thus formed cured resin layer may also contain various additives to impart various functions or performances thereto. Examples of the various functions include those capable of attaining a high hardness and a good marring resistance such as functions as so-called hard coat, anti-fogging coat, anti-fouling coat, anti-glare coat, anti-reflecting coat, ultraviolet-shielding coat and infrared-shielding coat.

Figure 10:
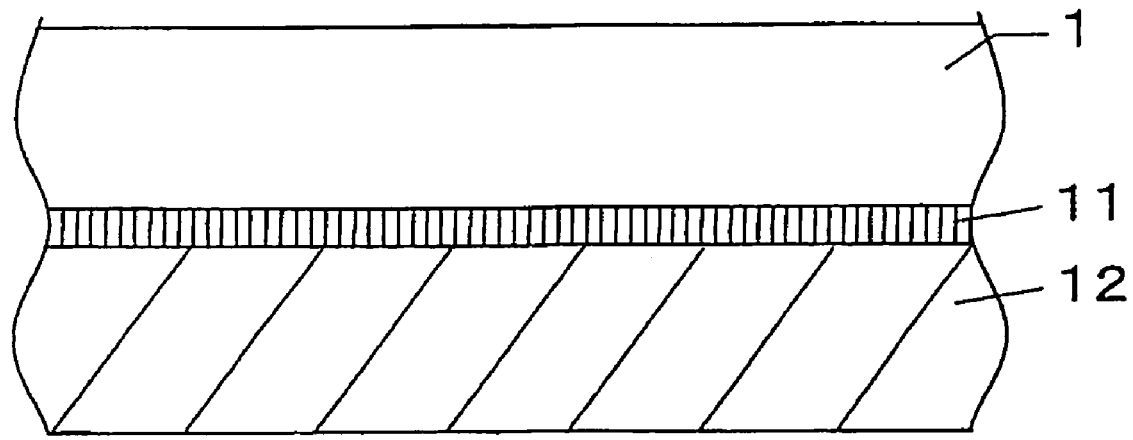
FIG. 10 is a schematic view showing a section of a decorative plate according to the present invention.

The decorative material of the present invention can be used as a decorative plate by attaching to various substrate plates. More specifically, as shown in FIG. 10, a decorative material 1 is attached onto a substrate plate 12 through an adhesive layer 11.

The substrate plate as an adherend is not particularly limited, and may be appropriately selected from plastic sheets, metal plates, wood plates such as timber, and ceramic materials according to the applications. One or both surfaces of these substrate plates, in particular, plastic sheet substrates, may be optionally subjected to various physical and chemical surface treatments such as those treatments using oxidation method and convex/concave-forming method in order to enhance adhesion of the substrate plate to the decorative material.

Examples of the treatments using the oxidation method include corona discharge treatment, chromate treatment, flame treatment, hot air treatment and ozone/ultraviolet treatment. Examples of the convex/concave-forming method include a sandblast method and a solvent-treating method. The surface treatment to be conducted may be appropriately selected according to the kind of substrate used, and in general, the corona discharge treatment is preferably used because of good effects and facilitated operation thereof.

The plastic sheets may be made of various synthetic resins. Examples of the synthetic resins include polyethylene resins, polypropylene resins, polymethylpentene resins, polyvinyl chloride resins, polyvinylidene chloride resins, polyvinyl alcohol resins, vinyl chloride/vinyl acetate copolymer resins, ethylene/vinyl acetate copolymer resins, ethylene/vinyl alcohol copolymer resins, polyethylene terephthalate resins, polybutylene terephthalate resins, polyethylene naphthalate/isophthalate copolymer resins, polymethyl methacrylate resins, polyethyl methacrylate resins, polybutyl acrylate resins, polyamide resins such as typically nylon 6 and nylon 66, cellulose triacetate resins, cellophane, polystyrene resins, polycarbonate resins, polyallylate resins and polyimide resins.

Examples of the metal plates include those plates made of aluminum, iron, stainless steel, copper, etc. In addition, there may also be used those substrates which are plated with these metals.

Examples of the wood plates include sliced veneers, veneers, plywood, particle boards and medium-density fiber (MDF) boards which are made of various materials such as Japanese cryptomeria, hinoki cypress, keyaki, pine, lauan, teak and Melapi. These wood plates may be used alone or in the form of a laminate of any two or more thereof. Meanwhile, the wood plates used herein involve not only plates made of wooden materials, but also plastic plates containing paper powder and reinforced high-strength papers.

Examples of the ceramic materials include ceramic-based building materials such as gypsum boards, calcium silicate boards and wood chip cement boards, pottery, glass, porcelain enamels, baked tiles and boards made of volcanic ash as a main raw material.

In addition to the above illustrated substrate plates, there may also be used composite plates of various materials such as a fiber-reinforced plastic (FRP) plate, a plate produced by attaching an iron plate onto both surfaces of a paper honeycomb and a polyethylene resin plate sandwiched between two aluminum plates.

The substrate plate may be subjected to further treatments for forming a primer layer thereon, adjusting a hue thereof by painting, or previously providing a designed pattern thereon. The substrate plate as an adherend may be a plate material such as a flat plate or a curved plate made of various materials, or a three-dimensional product (molded article) in which the materials are used singly or in the form of a composite thereof.

The substrate plate may be attached with a backing or lining material such as Japanese papers, machine-made papers, synthetic papers, nonwoven fabrics, woven fabrics, cheese cloths, impregnated papers and synthetic resin sheets. By using such a substrate plate to which the backing or lining material is attached, the decorative material can be reinforced by itself, and can be effectively prevented from suffering from occurrence of cracks or rupture and bleeding of adhesives onto a surface thereof, resulting in reduction of defectives and facilitated handling procedure as well as increased yield.

The substrate plate on which the decorative material in the form of a cut sheet or a continuous sheet is placed through an adhesive is then pressed or compressed using a laminating apparatus such as a cold press, a hot press, a roll press, a laminator, a lapping machine, a edge-bonding machine and a vacuum press to allow the decorative material to adhere to a surface of the substrate plate, thereby producing a decorative plate.

The adhesive may be applied using a coating apparatus such as a spray coater, a spreader and a bar coater. Examples of the adhesive include vinyl acetate resin-based adhesives, urea resin-based adhesives, melamine resin-based adhesives, phenol resin-based adhesives and isocyanate-based adhesives. These adhesives may be used alone or in the form of a mixed adhesive obtained by mixing any two or more thereof with each other at an optional mixing ratio. The adhesive may contain, if required, inorganic powder such as talc, calcium carbonate, clay and titanium white, wheat flour, wood chips, plastic chips, colorants, insecticides, mildew-proof agents, etc. In general, the adhesive has a solid content of 35 to 80% by mass, and is applied onto the surface of the substrate plate in an amount of 50 to 300 g/m$^2$.

The decorative material may be usually attached onto the substrate plate by forming an adhesive layer on a back surface of the decorative material of the present invention and then bonding the substrate plate onto the adhesive layer, or by applying an adhesive onto the substrate plate and then bonding the decorative material onto the substrate plate through the adhesive.

The thus produced decorative plate may be cut into an optional size, and then the surface or butt end portion thereof may be subjected to optional decorating processes such as grooving and chamfering by means of a cutting machine such as a router and a cutter. The resultant decorative plate may be used in various applications, e.g., interior or exterior materials for buildings such as walls, ceilings and floors; surface decorative plates for fittings such as window frames, doors, balustrades, baseboards, verandahs and malls as well as for kitchen wares, furniture, light-electrical appliances or OA devices, interior and exterior equipments for vehicles, etc.

EXAMPLES

The present invention will be described in more detail by referring to the following examples. However, it should be noted that these examples are only illustrative and not intended to limit the invention thereto.
(Evaluation Methods)

The decorative materials obtained in the respective Examples were evaluated by the following methods.
(1) Evaluation of Gloss The gloss values of a high-gloss region and a low-gloss region were measured at an incident angle of 75° using a gloss meter "GMX-203" available from Murakami Shikisai Gijutsu Kenkyusho, Co., Ltd. The higher value indicates a higher gloss (higher luster), and the lower value indicates a lower gloss (lower luster).
(2) Water Resistance A cup filled with water was fixedly placed in an upside-down state on a surface of the decorative material, allowed to stand under the same condition for 24 h, and then removed from the decorative material. Thereafter, the decorative material was allowed to stand at room temperature for 24 h, and then the surface thereof was observed by naked eyes to determine whether any change such as swelling occurred or not. The results are evaluated according to the following criteria:
⊚: No change occurred
Δ: Slight change occurred, but within practically acceptable level
X: Severe change such as swelling occurred
(3) Releasability with Passage of Time A cellophane tape (cellophane adhesive tape "CELLO-TAPE" (registered trademark) available from Nichiban Co., Ltd.; width: 2.5 mm) was attached onto a surface of the decorative material, allowed stand at room temperature (25°) and 50° C. for 24 h, and then forcibly peeled off. The surface portion of the decorative material from which the cellophane tape was released, was observed by naked eyes, and evaluated according to the following criteria:
⊚: No peeling-off of the pattern occurred at any temperature
Δ: Slight peeling-off of the pattern occurred, but within practically acceptable level
X: Severe peeling-off of the pattern occurred
(4) Stain Resistance According to JIS K-6902, contaminants were applied onto a surface of the decorative material, and then wiped off. The surface of the decorative material was observed by naked eyes to determine whether any contaminants remained thereon or not. The results were evaluated according to the following criteria:
⊚: No contaminants remained
Δ: Slight contaminants remained, but within practically acceptable level
X: Considerable amount of contaminants remained
(5) Marring Performance Steel wool (#0000) was fitted to a weight adjusted to 29.4 kPa (300 g/cm$^2$), and the surface of the decorative material was rubbed with the steel wool 50 times. The rubbed surface portion of the decorative material was observed by naked eyes to determine the change in gloss, and the results were evaluated according to the following criteria:
⊚: No change in gloss occurred
Δ: Slight change in gloss occurred, but within practically acceptable level
X: Severe change in gloss occurred Example 1

Using an interlaminar-reinforced paper for building materials having a basis weight of 30 g/m$^2$ as the substrate 2, a (whole solid printing) layer having a coating amount of 5 g/m$^2$ was formed on one surface of the substrate with an ink containing a binder composed of an acrylic resin and nitrocellulose and a colorant composed of titanium white, iron oxide red and chrome yellow by a gravure printing method, thereby forming a colored layer 6. A pattern layer 7 with a woodgrain pattern was formed on the colored layer 6 by a gravure printing method using an ink containing a binder composed of nitrocellulose and a colorant composed mainly of iron oxide red.

Next, a coating composition containing a binder composed of a polyester urethane-based resin having a number-average molecular weight of 20,000 and a glass transition temperature (Tg) of −59.8° C. and a polyisocyanate obtained from tolylene diisocyanate, was applied in a coating amount of 7 g/m$^2$ over a whole surface of the substrate by a gravure printing method, thereby forming a penetration-preventing layer 8 (primer layer).

Next, using an ink composition prepared by blending 100 parts by mass of a transparent ink containing a polyester urethane-based resin having a number-average molecular weight of 30,000 and a glass transition temperature (Tg) of −62.8° C. as a binder with 10 parts by mass of silica particles having an average particle size of 1.5 μm, an ink pattern was printed by a gravure printing method so as to coordinate with a vessel portion of the woodgrain pattern of the pattern layer 7, thereby forming a low-luster pattern ink layer 3.

Then, an electron beam-curable resin composition composed of 60 parts by mass of ethyleneoxide-modified trimethylolpropane ethyleneoxide triacrylate as a trifunctional acrylate monomer, 40 parts by mass of dipentaerythritol hexaacrylate as a hexafunctional acrylate monomer, 2 parts by mass of silica particles having an average particle size of 5 μm and 1 part by mass of a silicone acrylate prepolymer was applied in a coating amount of 5 g/m² over these ink layers by a gravure offset coater method. After coating, an electron beam was irradiated to the thus applied electron beam-curable resin composition at an acceleration voltage of 175 kV and an exposure dose of 5 kGy (5 Mrad) to cure the composition, thereby forming a surface protective layer 5. Then, the resultant laminate was cured at 70° C. for 24 h, thereby obtaining a decorative material.

The thus obtained decorative material was examined to evaluate gloss, water resistance, releasability with passage of time, stain resistance and marring performance thereof. The results are shown in Table 1.

Example 2

The same procedure as in Example 1 was repeated except for using a blackish brown ink containing a binder resin obtained by mixing 90% by mass of a polyester urethane-based resin with 10% by mass of an unsaturated polyester resin, and a colorant composed of carbon black and iron oxide red, as the low-luster pattern ink, thereby obtaining a decorative material.

The thus obtained decorative material was examined to evaluate gloss, water resistance, releasability with passage of time, stain resistance and marring performance thereof. The results are shown in Table 1.

The respective decorative materials obtained in Examples 1 and 2 were observed by magnifying a section thereof using a microscope. As a result, it was confirmed that a portion of the surface protective layer located just above the low-luster pattern ink layer and in the vicinity thereof was kept in a low-gloss state exhibiting light scattering, whereas the other surface portion of the surface protective layer exhibited no light scattering and was kept in a highly-transparent state. Further, when the decorative materials were observed by naked eyes from the side of the surface protective layer, the low-luster pattern ink layer was recognized as a concave portion.

Example 3

The same procedure as in Example 1 was repeated except that the content of the silica particles having an average particle size of 5 μm in the electron-beam-curable resin composition was changed to 8 parts by mass, thereby obtaining a decorative material.

The thus obtained decorative material was examined to evaluate gloss, water resistance, releasability with passage of time, stain resistance and marring performance thereof. The results are shown in Table 1.

Example 4

The same procedure as in Example 1 was repeated except that as a binder resin of the ink for forming the low-luster pattern ink layer, there was used a mixture composed of 80% by mass of the same polyester urethane-based resin as used in Example 1 and 20% by mass of an unsaturated polyester resin, and the content of the silica particles having an average particle size of 5 μm in the electron-beam-curable resin composition was changed to 8 parts by mass, thereby obtaining a decorative material.

The thus obtained decorative material was examined to evaluate gloss, water resistance, releasability with passage of time, stain resistance and marring performance thereof. The results are shown in Table 1.

The respective decorative materials obtained in Examples 3 and 4 were observed by magnifying a section thereof using a microscope. As a result, it was confirmed that a portion of the surface protective layer located just above the low-luster pattern ink layer and in the vicinity thereof was kept in a low-gloss state exhibiting light scattering, whereas the other surface portion of the surface protective layer exhibited no light scattering and was kept in a highly-transparent state. Further, when the decorative materials were observed by naked eyes from the side of the surface protective layer, the low-luster pattern ink layer was recognized as a concave portion.

In addition, the vessel portion of woodgrain pattern of the decorative material obtained in Example 4 was more sharply recognized as a visual concave portion as compared to that obtained in Example 1.

TABLE 1

| | Examples | | | |
|---|---|---|---|---|
| | 1 | 2 | 3 | 4 |
| Gloss: | | | | |
| High-gloss region | 40 | 40 | 40 | 40 |
| Low-gloss region | 10 | 10 | 10 | 8 |
| Water resistance | ◎ | ◎ | ◎ | ◎ |
| Releasability with time | ◎ | ◎ | ◎ | ◎ |
| Stain resistance | ◎ | ◎ | ◎ | ◎ |
| Marring performance | ◎ | ◎ | ◎ | ◎ |

Example 5

The same procedure as in Example 1 was repeated except that the low-luster pattern ink layer 3 was constructed from three-stage gradation portions 3-a, 3-b and 3-c as shown in FIG. 6, thereby obtaining a decorative material. The coating amounts of inks for forming the gradation portions 3-a, 3-b and 3-c are shown in Table 2

The thus obtained decorative material was examined to evaluate gloss, water resistance, releasability with passage of time, stain resistance and marring performance thereof. The results are shown in Table 2.

Example 6

The same procedure as in Example 5 was repeated except that a coating amount of the low-luster pattern ink for forming the low-luster pattern ink layer 3 was continuously varied such that the thickness of the resultant layer was continuously changed as shown in FIG. 7, thereby obtaining a decorative material. Meanwhile, the constructions of the substrate, colored layer, pattern layer and penetration-preventing layer were identical to those used in Example 5.

The coating amount of the low-luster pattern ink was continuously reduced from 8 g/m² at a central portion of the layer having a largest thickness to 0 g/m² at a circumferential peripheral portion of the layer having a generally circular shape with a radius of 1 cm around the central portion.

The thus obtained decorative material was examined to evaluate gloss, water resistance, releasability with passage of time, stain resistance and marring performance thereof. The results are shown in Table 2.

The respective decorative materials obtained in Examples 5 and 6 were observed by magnifying a section thereof using a microscope. As a result, it was confirmed that a portion of the surface protective layer located just above the low-luster pattern ink layer and in the vicinity thereof was kept in a low-gloss state exhibiting light scattering, whereas the other surface portion of the surface protective layer exhibited no light scattering and was kept in a highly-transparent state. Further, when the decorative material obtained in Example 5 was observed by naked eyes from the side of the surface protective layer, the low-luster pattern ink layer was visually recognized as a concave portion, and the concave portion was stepwise changed, i.e., was recognized as a so-called gradation pattern. In addition, when the decorative material obtained in Example 6 was observed by naked eyes from the side of the surface protective layer, the low-luster pattern ink layer was visually recognized as a concave portion, and the concave portion was recognized as a continuously changed pattern.

TABLE 2

|  | Example 5 | | Example 6 | |
| --- | --- | --- | --- | --- |
|  | Coating amount of ink (g/m²) | Gloss | Coating amount of ink (g/m²) | Gloss |
| High-gloss region | 0 | 50 | 0 | 50 |
| Low-gloss region 1 (3-c) | 4 | 30 | — | — |
| Low-gloss region 1 (3-b) | 6 | 20 | — | — |
| Low-gloss region 1 (3-a) | 8 | 10 | 8 | 10 |
| Water resistance | ⊚ | | ⊚ | |
| Releasability with time | ⊚ | | ⊚ | |
| Stain resistance | ⊚ | | ⊚ | |
| Marring performance | ⊚ | | ⊚ | |

Example 7

Using an interlaminar-reinforced paper for building materials having a basis weight of 30 g/m² as the substrate 2, a (whole solid printing) layer having a coating amount of 5 g/m² was formed on one surface of the substrate with an ink containing a binder composed of an acrylic resin and nitrocellulose and a colorant composed of titanium white, iron oxide red and chrome yellow by a gravure printing method, thereby forming a colored layer 6. A pattern layer 7 with a woodgrain pattern was formed on the colored layer 6 by a gravure printing method using an ink containing a binder composed of nitrocellulose and a colorant composed mainly of iron oxide red.

Next, a coating composition containing a binder composed of a polyester urethane-based resin having a number-average molecular weight of 20,000 and a glass transition temperature (Tg) of −59.8° C. and a polyisocyanate obtained from tolylene diisocyanate, was applied in a coating amount of 7 g/m² over a whole surface of the substrate by a gravure printing method, thereby forming a penetration-preventing layer 8.

Next, using an ink composition prepared by blending 100 parts by mass of a transparent ink containing a polyester urethane-based resin having a number-average molecular weight of 30,000 and a glass transition temperature (Tg) of −62.8° C. as a binder with 10 parts by mass of silica particles having an average particle size of 1.5 μm, an ink pattern was printed by a gravure printing method so as to coordinate with a vessel portion of the woodgrain pattern of the pattern layer 7, thereby forming a low-luster pattern ink layer 3. The coating amount of the low-luster patter ink was 3 g/m², and the thickness of the low-luster pattern ink layer 3 after forming the surface protective layer thereon in the next step was 2 μm.

Then, an electron beam-curable resin composition composed of 60 parts by mass of ethyleneoxide-modified trimethylolpropane ethyleneoxide triacrylate as a trifunctional acrylate monomer, 40 parts by mass of dipentaerythritol hexaacrylate as a hexafunctional acrylate monomer, 8 parts by mass of silica particles having an average particle size of 5 μm and a CV value of 10%, and 1 part by mass of a silicone acrylate prepolymer was applied in a coating amount of 6 g/m² on these ink layers by a gravure offset coater method. After coating, an electron beam was irradiated to the thus applied electron beam-curable resin composition at an acceleration voltage of 175 kV and an exposure dose of 5 kGy (5 Mrad) to cure the composition, thereby forming a surface protective layer 5. The thickness of the portion of the surface protective layer 5 where no low-luster pattern ink layer 3 was present was 4 μm. Then, the resultant laminate was cured at 70° C. for 24 h, thereby obtaining a decorative material.

The thus obtained decorative material was examined to evaluate gloss, water resistance, releasability with passage of time, stain resistance and marring performance thereof. The results are shown in Table 3.

Reference Example 1

The same procedure as in Example 7 was repeated except for using silica particles having an average particle size of 1.0 μm and a CV value of 10% in the electron beam-curable resin composition, thereby obtaining a decorative material.

The thus obtained decorative material was examined to evaluate gloss, water resistance, releasability with passage of time, stain resistance and marring performance thereof. The results are shown in Table 3.

Reference Example 2

The same procedure as in Example 7 was repeated except for using silica particles having an average particle size of 6.0 μm and a CV value of 10% in the electron beam-curable resin composition, thereby obtaining a decorative material.

The thus obtained decorative material was examined to evaluate gloss, water resistance, releasability with passage of time, stain resistance and marring performance thereof. The results are shown in Table 3.

Reference Example 3

The same procedure as in Example 7 was repeated except for using no silica particles in the electron beam-curable resin composition, thereby obtaining a decorative material.

The thus obtained decorative material was examined to evaluate gloss, water resistance, releasability with passage of time, stain resistance and marring performance thereof. The results are shown in Table 3.

The respective decorative materials obtained in Example 7 and Reference Examples 1 to 3 were observed by magnifying a section thereof using a microscope. As a result, it was confirmed that a portion of the surface protective layer located just above the low-luster pattern ink layer and in the vicinity thereof was kept in a low-gloss state exhibiting light scattering, whereas the other surface portion of the surface protective layer exhibited no light scattering and was kept in a highly-transparent state. Also, in the decorative material obtained in Example 7, protrusion of the silica particles was recognized on a surface portion of the surface protective layer located just above the low-luster pattern ink layer, but no protrusion of the silica particles was recognized on the other portion of the surface protective layer where no low-luster pattern ink layer was present.

On the other hand, in the decorative material obtained in Reference Example 1, protrusion of the silica particles was recognized on neither a surface portion of the surface protective layer located just above the low-luster pattern ink layer nor the other portion of the surface protective layer where no low-luster pattern ink layer was present. In addition, in the decorative material obtained in Reference Example 2, protrusion of the silica particles was recognized on both a surface portion of the surface protective layer located just above the low-luster pattern ink layer and the other portion of the surface protective layer where no low-luster pattern ink layer was present.

Further, when the respective decorative materials obtained above were observed by naked eyes from the side of the surface protective layer, the low-luster pattern ink layer was visually recognized as a concave portion. Also, a vessel portion of the woodgrain pattern of the decorative material obtained in Example 7 was more sharply recognized as a visual concave portion as compared to those obtained in Reference Examples.

Example 8

The same procedure as in Example 1 was repeated except that an exposure dose of the electron beam was changed to 30 kGy (3 Mrad), thereby obtaining a decorative material. As a result of observing the obtained decorative material by naked eyes, it was confirmed that a vessel portion of the woodgrain pattern thereof had a sharp shape.

Reference Example 4

The same procedure as in Example 8 was repeated except for using a vessel-printing ink containing no silica, thereby obtaining a decorative material. As a result of observing the obtained decorative material by naked eyes, it was confirmed that a vessel portion of the woodgrain pattern thereof was lacking in sharpness as compared to that of the decorative material obtained in Example 8.

Example 9

The same procedure as in Example 8 was repeated except that the content of silica in the vessel-printing ink was changed to 20% by mass, thereby obtaining a decorative material. As a result of observing the obtained decorative material by naked eyes, it was confirmed that although the vessel portion of the woodgrain pattern thereof was not sufficiently lowered in gloss and therefore a design feeling of the vessel portion was not necessarily satisfactory, the vessel portion had a sharp shape.

Example 10

The same procedure as in Example 8 was repeated except that a printing plate for the vessel-printing ink was made by varying a depth of the plate so as to provide portions which were different in amount of the ink to be transferred from each other, thereby obtaining a decorative material. More specifically, the obtained printing plate was such a gradation printing plate in which the depth of the printing plate was 70 μm at a deepest portion thereof and gradually varied from a cell-free portion toward the deepest portion having a depth of 70 μm while continuously adjusting the depth. The gloss of a region corresponding to the cell-free portion was 60, the gloss of a region corresponding to the portion having a depth of 30 to 40 μm was 30, the gloss of a region corresponding to the portion having a depth of 60 to 70 μm was 10, and the gloss of other regions between these regions was continuously varied. It was confirmed that when the thus produced printing plate was used together with the vessel-printing ink according to the present invention, the resultant decorative material exhibited a woodgrain pattern closer to that of natural wood.

Example 11

The same procedure as in Example 1 was repeated except for further adding 10 parts by mass of baked kaolin having an average particle size of 1.5 μm to the electron beam-curable resin composition, thereby obtaining a decorative material. The obtained decorative material was examined to evaluate gloss, water resistance, releasability with passage of time, stain resistance and marring performance thereof The results are shown in Table 3. It was confirmed that by adding the baked kaolin to the electron beam-curable resin composition, the obtained decorative material exhibited a higher marring resistance than that of the decorative material obtained in Example 1.

TABLE 3

| | Example | Reference Examples | | | Example |
|---|---|---|---|---|---|
| | 7 | 1 | 2 | 3 | 11 |
| Gloss: | | | | | |
| High-gloss region | 60 | 80 | 40 | 80 | 40 |
| Low-gloss region | 10 | 50 | 10 | 50 | 10 |
| Water resistance | ◎ | ◎ | ◎ | ◎ | ◎ |
| Releasability with time | ◎ | ◎ | ◎ | ◎ | ◎ |
| Stain resistance | ◎ | ◎ | ◎ | ◎ | ◎ |
| Marring performance | ◎ | ◎ | ◎ | Δ | ◎ |

Example 12

A lauan plywood 10 as a substrate plate having a thickness of 2.5 mm was bonded onto a back surface of the decorative material obtained in Example 1 through an adhesive layer formed by applying onto the plywood, an ethylene/vinyl acetate-based-adhesive "BA-820" as a water-based emulsion available from Chuo Rika Co., Ltd., in a coating amount of 60 g/m$^2$ (wet), thereby producing a wooden decorative plate.

INDUSTRIAL APPLICABILITY

In accordance with the present invention, it is possible to obtain a decorative material having a pattern on a surface thereof as well as a difference in gloss according to the pattern which can be visually recognized as a concave portion to thereby impart a convexo-concave feeling to the surface thereof, and exhibiting a high solvent resistance, a high abrasion resistance and a high interlaminar strength. In particular, when a woodgrain pattern is formed on the decorative material, the difference in gloss and convexo-concave feeling of a vessel portion of the woodgrain pattern can be expressed with reality, so that the same texture as that of actual wood material can be obtained.

The invention claimed is:

1. A decorative material comprising at least a substrate, a low-luster pattern ink layer formed on a part of the substrate, leaving a part of the substrate on which the low-luster pattern ink layer is not formed, and a surface protective layer which is present on and in direct contact with the low-luster pattern ink layer so as to cover a whole surface including both a region where the low-luster pattern ink layer is formed and a region where no low-luster pattern ink layer is formed, wherein the surface protective layer is formed by crosslinking and curing an ionizing radiation-curable resin composition, and provided therein with a first, low-gloss region which is located in a first portion of the surface protective layer just above the low-luster pattern ink layer and in the vicinity of the first portion, and with a second region, located in the surface protective layer in a second portion other than the first portion and the vicinity of the first portion, the first, low-gloss region having a lower gloss than the second region, the low-luster pattern ink layer serving to generate a difference in gloss between the first and second regions, the first, low-gloss region being visually recognized as a concave portion, wherein said first, low-gloss region is a region in which, prior to curing the ionizing radiation-curable resin composition of the surface protective layer, resin components of low-luster pattern ink contained in the low-luster pattern ink layer and uncured radiation-curable resin of the ionizing radiation-curable resin composition are mixed but not completely compatibilized with each other and are kept in a suspended state, which mixture is fixed upon crosslinking and curing the surface protective layer, whereby in the first, low-gloss region the low-luster pattern ink and the resin composition of the surface protective layer have interacted with each other to provide partial elution, dispersion and mixing therebetween, so as to be in a suspended state which is fixed in the first, low-gloss region, the low-luster pattern ink forming the low-luster pattern ink layer containing a non-crosslinked urethane resin and an unsaturated polyester resin as a binder, the non-crosslinked urethane resin having a number average molecular weight in a range of 10,000 to 50,000 and a glass transition temperature in a range of −70° to −40°C.

2. A decorative material comprising at least a substrate, a low-luster pattern ink layer formed on part of the substrate, leaving a part of the substrate on which the low-luster pattern ink layer is not formed, and a surface protective layer which is present on and in direct contact with the low-luster pattern ink layer so as to cover a whole surface including both a region where the low-luster pattern ink layer is formed and a region where no low-luster pattern ink layer is formed, the low-luster pattern ink layer serving to generate a difference in gloss between the region where the low-luster pattern ink layer is formed and the region where no low-luster pattern ink layer is formed, wherein the surface protective layer is formed by crosslinking and curing an ionizing radiation-curable resin composition, a low-luster pattern ink forming the low-luster pattern ink layer contains a non-crosslinked urethane resin as a binder and the ionizing radiation-curable resin composition contains a (meth)acrylate monomer, the non-crosslinked urethane resin having a number average molecular weight in a range of 10,000 to 50,000 and a glass transition temperature in a range of −70° to −40°C., wherein a low-gloss region is provided in a first portion of the surface protective layer just above the low-gloss pattern ink layer and in the vicinity of the first portion, and wherein said low-gloss region is a region in which, prior to curing the ionizing radiation-curable resin composition of the surface protective layer, resin components of the low-luster pattern ink contained in the low-luster pattern ink layer and uncured radiation-curable resin of the ionizing radiation-curable resin composition are mixed but not completely compatibilized with each other and are kept in a suspended state, which mixture is fixed upon crosslinking and curing the surface protective layer, whereby in the low-gloss region the low-luster pattern ink and the resin composition of the surface protective layer have interacted with each other to provide partial elution, dispersion and mixing therebetween, so as to be in a suspended state which is fixed in the low-gloss region.

3. The decorative material according to claim 2, wherein the low-luster pattern ink forming the low-luster pattern ink layer contains the non-crosslinked urethane resin and an unsaturated polyester resin as a binder.

4. The decorative material according to claim 2, wherein the ionizing radiation-curable resin composition contains a (meth)acrylate monomer solely.

5. The decorative material according to claim 1, wherein the low-luster pattern ink forming the low-luster pattern ink layer has an uneven thickness.

6. The decorative material according to claim 5, wherein the low-luster pattern ink layer has a first sub-layer and a second sub-layer having a relatively small thickness as compared to the thickness of the first sub-layer, and a portion just above and in the vicinity of the first sub-layer is a first sub-region, whereas a portion just above and in the vicinity of the second sub-layer is a second sub-region having a relatively high gloss as compared to that of the first sub-region.

7. The decorative material according to claim 1, wherein the surface protective layer contains fine particles, and an average particle size of the fine particles is larger than a maximum thickness of the surface protective layer located just above the low-luster pattern ink layer such that the fine particles are protruded on the surface of the surface protective layer above the low-luster pattern ink layer.

8. The decorative material according to claim 7, wherein a coefficient of variation (CV value) of a particle size distribution of the fine particles which is represented by the formula: [(standard deviation of particle size/average particle size) ×100] is 30% or lower.

9. The decorative material according to claim 7, wherein the fine particles satisfy a relationship represented by the following formula (I):

$$1.05 \times t_M \leq d_A \leq t_G \qquad (I)$$

wherein $d_A$ is an average particle size of the fine particles; $t_M$ is a maximum thickness of the surface protective layer located just above the low-luster pattern ink layer; and $t_G$ is a thickness of the surface protective layer located in a region where no low-luster pattern ink layer is formed.

10. The decorative material according to claim 7, wherein the surface protective layer contains the fine particles in an amount of 2 to 20% by mass.

11. The decorative material according to claim 1, wherein the surface protective layer is formed by crosslinking and curing the ionizing radiation-curable resin composition containing an ethylene oxide-modified polymerizable compound, and contains particles of baked kaolin.

12. The decorative material according to claim 1, wherein the low-luster pattern ink forming the low-luster pattern ink layer contains an extender pigment.

13. The decorative material according to claim 1, wherein the ionizing radiation-curable resin composition is an electron beam-curable resin composition.

14. The decorative material according to claim 1, wherein a surface of the surface protective layer located above the first, low-gloss region has a convex shape.

15. The decorative material according to claim 1, further comprising a penetration-preventing layer formed between the substrate and the low-luster pattern ink layer.

16. The decorative material according to claim 15, wherein the substrate is a penetrable substrate.

17. The decorative material according to claim 1, wherein a colored layer, a pattern layer and a penetration-preventing layer are successively laminated on the substrate, providing laminated layers, and the low-luster pattern ink layer as well as the surface protective layer which is present on and in direct contact with the low-luster pattern ink layer so as to cover a whole surface including both the region where the low-luster pattern ink layer is formed and the region where no low-luster pattern ink layer is formed, are successively formed on the laminated layers.

18. The decorative material according to claim 17, wherein the pattern layer has a woodgrain pattern, and the low-luster pattern ink layer forms a low-gloss region corresponding to vessels of the woodgrain pattern.

19. A decorative plate comprising a substrate plate and the decorative material as defined in claim 1 which is attached onto the substrate plate.

20. The decorative material according to claim 2, wherein the low-luster pattern ink forming the low-luster pattern ink layer has an uneven thickness.

21. The decorative material according to claim 2, wherein the surface protective layer contains fine particles, and an average particle size of the fine particles is larger than a maximum thickness of the surface protective layer located just above the low-luster pattern ink layer such that the fine particles are protruded on the surface of the surface protective layer above the low-luster pattern ink layer.

22. The decorative material according to claim 2, wherein the surface protective layer is formed by crosslinking and curing the ionizing radiation-curable resin composition containing an ethylene oxide-modified polymerizable compound, and contains particles of baked kaolin.

23. The decorative material according to claim 2, wherein the low-luster pattern ink forming the low-luster pattern ink layer contains an extender pigment.

24. The decorative material according to claim 2, wherein the ionizing radiation-curable resin composition is an electron beam-curable resin composition.

25. The decorative material according to claim 2, wherein a surface of the surface protective layer located above the low-luster pattern ink layer has a convex shape.

26. The decorative material according to claim 2, further comprising a penetration-preventing layer formed between the substrate and the low-luster pattern ink layer.

27. The decorative material according to claim 2, wherein a colored layer, a pattern layer and a penetration-preventing layer are successively laminated on the substrate, providing laminated layers, and the low-luster pattern ink layer as well as the surface protective layer which is present on and in direct contact with the low-luster pattern ink layer so as to cover a whole surface including both the region where the low-luster pattern ink layer is formed and the region where no low-luster pattern ink layer is formed, are successively formed on the laminated layers.

28. A decorative plate comprising a substrate plate and the decorative material as defined in to claim 2 which is attached onto the substrate plate.

29. The decorative material according to claim 1, wherein a penetration-preventing layer is provided between the substrate and the low-luster pattern ink layer, and on the penetration-preventing layer the low-luster pattern ink layer and the surface protective layer are provided.

30. The decorative material according to claim 2, wherein a penetration-preventing layer is provided between the substrate and the low-luster pattern ink layer, and on the penetration-preventing layer the low-luster pattern ink layer and the surface protective layer are provided.

31. The decorative material according to claim 1, wherein the mixture, fixed in the suspended state, scatters light so as to impart to the first, low-gloss region a lower gloss than that of the second region.

32. The decorative material according to claim 31, wherein said first, low-gloss region, having a lower gloss than that of the second region, is recognized as a concave portion due to optical illusion.

33. The decorative material according to claim 2, wherein the mixture, fixed in the suspended state, scatters light so as to impart a low gloss to the low-gloss region.

34. The decorative material according to claim 33, wherein said low-gloss region is recognized as a concave portion due to optical illusion.

* * * * *